(12) United States Patent
Dong et al.

(10) Patent No.: US 6,837,047 B2
(45) Date of Patent: Jan. 4, 2005

(54) HYDRAULIC DEVICES FOR SMOOTH OPERATIONS OF HYDROSTATIC TRANSMISSION

(75) Inventors: Xingen Dong, Greeneville, TN (US); James S. Whitaker, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 42 days.

(21) Appl. No.: 10/457,936

(22) Filed: Jun. 10, 2003

(65) Prior Publication Data

US 2004/0006981 A1 Jan. 15, 2004

Related U.S. Application Data

(60) Provisional application No. 60/395,865, filed on Jul. 12, 2002.

(51) Int. Cl.[7] .............................................. F16D 31/02
(52) U.S. Cl. ..................... 60/464; 137/118.06; 137/114
(58) Field of Search .......................... 60/464, 488, 444, 60/487, 389, 443, 445, 465, 455; 137/625.66, 118.01, 118.02, 118.06, 114

(56) References Cited

U.S. PATENT DOCUMENTS

| | | | |
|---|---|---|---|
| 1,967,383 A | * 7/1934 | Pierre | 137/118.06 |
| 2,961,829 A | * 11/1960 | Weisenbach | 60/464 |
| 3,260,325 A | 7/1966 | Brown et al. | |
| 3,507,298 A | * 4/1970 | Ratliff | 137/114 |
| 3,561,214 A | * 2/1971 | Bobst | 60/430 |
| 3,583,157 A | * 6/1971 | Adams et al. | 60/464 |
| 3,740,950 A | 6/1973 | Polaski | |
| 3,846,982 A | * 11/1974 | Rometsch et al. | 60/488 |
| 3,924,650 A | * 12/1975 | Parquet | 137/118.02 |
| 4,040,439 A | 8/1977 | Uppal | |
| 4,250,909 A | * 2/1981 | Adams | 137/101 |
| 5,211,015 A | * 5/1993 | Schroeder | 60/468 |
| 5,992,148 A | 11/1999 | Satake | |
| 6,244,048 B1 | 6/2001 | Tanaka | |
| 6,295,811 B1 | 10/2001 | Mangano et al. | |
| 6,698,197 B1 | * 3/2004 | Peterson | 60/464 |

* cited by examiner

Primary Examiner—Edward K. Look
Assistant Examiner—Igor Kershteyn
(74) Attorney, Agent, or Firm—Joseph J. Pophal

(57) ABSTRACT

A hydraulic valve assembly, for use in a hydrostatic transmission, for controlling fluid transfer between a first, a second and a third line, wherein two of the lines define first and second pressure lines, within a closed-loop circuit. The valve assembly comprises: a valve body having ports in communication with the three lines; a spool bore; a valve spool, adapted for sealing reciprocation within the spool bore, having a first and second end portion, a connecting portion, and a first and second bypass orifice within the valve spool; and dampers for centering the valve spool. This spool is movable from a neutral position occurring when the fluid pressure forces in the first and second pressure lines are substantially similar, to a first or a second position occurring when the fluid pressure force in the first pressure line is greater or less than that in the second pressure line, respectively. The bypass orifices are enabled in the neutral position, but are substantially disabled in the first and second positions. A hydraulic system utilizing the valve assembly and a method for increasing the width of the dead band of the hydrostatic transmission in a neutral mode of operation are also set forth.

42 Claims, 13 Drawing Sheets

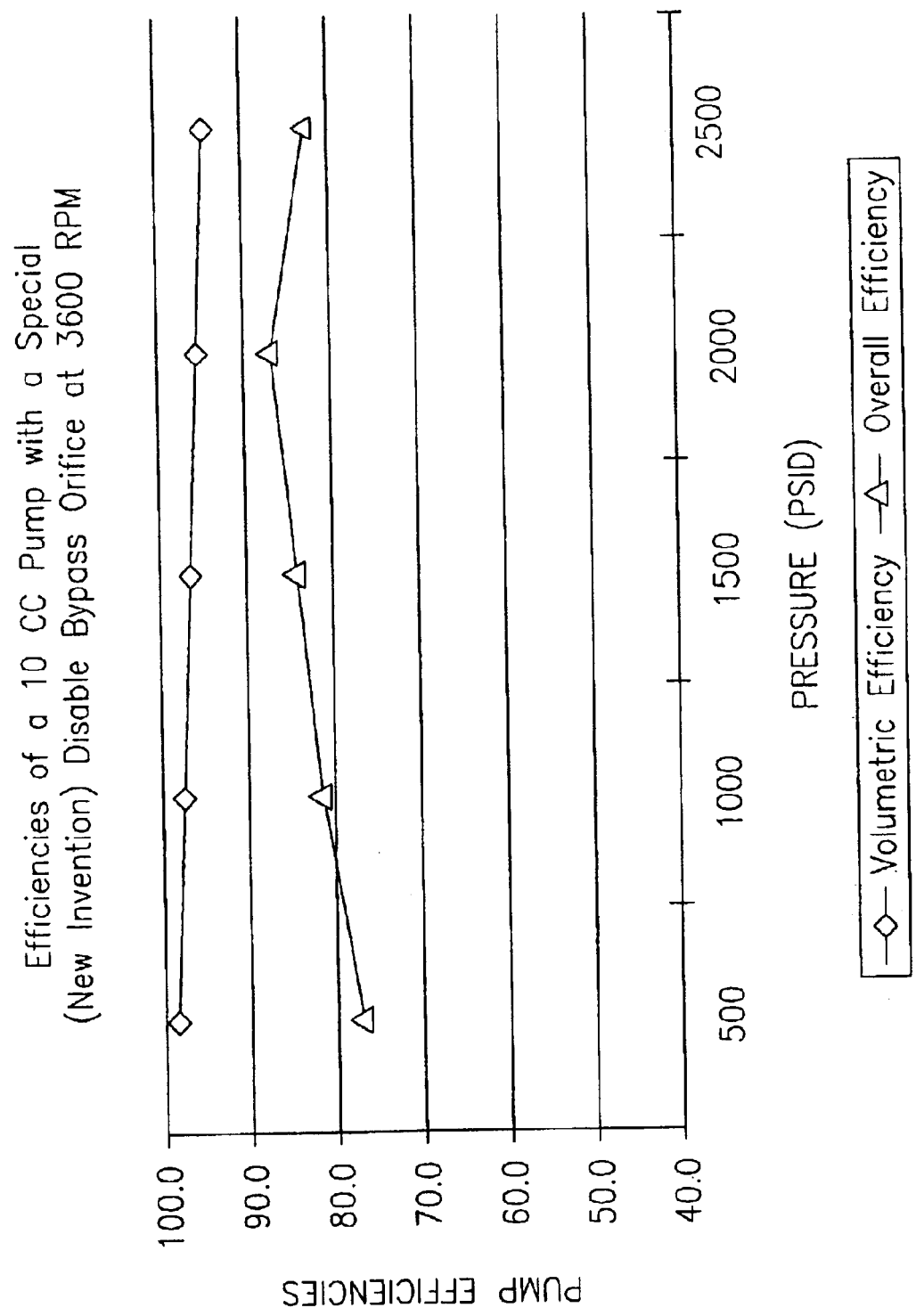

US 6,837,047 B2

HYDRAULIC DEVICES FOR SMOOTH OPERATIONS OF HYDROSTATIC TRANSMISSION

CROSS-REFERENCE TO RELATED CASES

The present application claims the benefit of the filing date of U.S. Provisional Application Ser. No. 60/395,865, filed Jul. 12, 2002, the disclosure of which is expressly incorporated herein by reference.

FIELD OF THE INVENTION

The present invention relates to a valve assembly and method for increasing the width of the dead band of a hydrostatic transmission in a neutral mode of operation without impairing the performance of the hydrostatic transmission in operating modes. The present invention further relates to a hydraulic system including the above mentioned valve assembly.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main pump connected in a closed hydraulic circuit with a fixed displacement hydraulic motor. For most applications, the pump is driven by a prime mover, such as an internal combustion engine or an electrical motor, at a certain speed in a certain direction. Changing the displacement of the pump will change its output flow rate, which controls the speed of the motor. Pump outflow can be reversed, thus reversing the direction of the motor. In a vehicle, the motor is connected directly or through suitable gearing to the vehicle's wheels or tracks. Acceleration and deceleration of the transmission are controlled by varying the displacement of the main pump from its neutral position. The present invention relates generally to the hydrostatic transmission and, more specifically, to the hydraulic pump/motor having integrated valves for providing a smoother operation during the acceleration phase of the transmission operation near its neutral position.

The closed hydraulic circuit includes a first conduit connecting the main pump outlet with the motor inlet and a second conduit connecting the motor outlet with the pump inlet. Either of these conduits may be the high pressure line depending upon the direction of pump displacement from neutral. A charge pump is added to the hydraulic circuit in order to charge the closed-circuit with hydraulic fluid through check valves, thus making up for possible lost fluid due to internal leakage. Other valves can be added to the closed-circuit. For example, high pressure relief valves can be used to protect the hydrostatic transmission from overloading during its operation, bypass valves can be used to allow oil to be routed from one side of the transmission to the other side without significant resistance, and hot-oil shuttle valves can be used to reduce the loop temperature by connecting the low pressure side of the closed loop to a drain, thus allowing replenishment with fresh, cooled replacement hydraulic fluid.

In hydrostatic applications, an over center variable displacement axial piston pump is used. The displacement of the pump is determined by the size and number of pistons, as well as the stroke length. A control handle enables the operator to control the direction and amount of flow from the pump. When an operator pushes the handle in one direction, the pump delivers flow for one direction of motor operation. When an operator pulls the handle in the opposite direction, the pump delivers flow for the opposite direction. To avoid a rough, jerky start of the motor, the prior art has utilized an orifice with a fixed diameter that is added to the closed-loop circuit to widen the width of the dead band of the hydrostatic transmission. The dead band of a hydrostatic transmission is the non-response range of the transmission near its neutral position where the motor will not turn over due to internal cross-port leakage across the bypass orifice. The orifice creates a bypass flow passage for the closed-loop, increases the dead band of the transmission, and allows the motor to start moving smoothly when the transmission is originally at neutral position. The size of the orifice is very important and the optimum diameter can be determined by carefully checking the change of stoking effects on the machine due to the change of orifice diameter. The orifice can also be integrated onto other hydraulic components, for example the aforementioned valves, within the closed-loop circuit.

Although the additional bypass orifice helps a machine obtain smooth operation near the neutral position of the hydrostatic transmission, there are disadvantages if the bypass orifice is fixed. A fixed bypass orifice allows a certain amount of flow routed from the high pressure side to the low pressure side of the closed-loop during all phases of the transmission's operations. This unwanted cross-port leakage not only reduces the overall efficiency of the hydrostatic transmission, but also generates substantial heat that increases the operating temperature of the closed loop. This can cause a safety issue for the machine and reduces its service life. An additional cooling device can be added, but this increases the cost and presents possible encumbrances when space is limited. It is desired that an orifice only performs its cross-port bypassing near the neutral position of the hydrostatic transmission, and then is disabled during the continuous operation of the motor.

Prior art, such as U.S. Pat. No. 3,740,950 to Polaski sets forth an example of a valve block design for use in a hydrostatic transmission application that consists of a cross-port bypass passage and two check valves interconnected by a spring. Flow though the valve is shut off when the spring between the two check valves is compressed. When one of the check valves is seated, flow through the bypass passages, as well as all flow through the valve block, is obstructed. This valve block design does not allow continued charging fluid to reach the low-pressure side without use of separate make-up check valves. Another prior art reference, U.S. Pat. No. 6,295,811 to Mangamo et al., also sets forth a design, which utilizes a bypass orifice in a valve for use in hydrostatic transmission applications. This design differs from the present invention in that the orifice can be disabled, but separate check valves are needed.

SUMMARY OF THE PRESENT INVENTION

The present invention provides a hydraulic valve assembly, comprised of a shuttle valve with integrated bypass orifices and an optional check valve connected at each end, for use in a hydrostatic transmission in order to provide improved efficiency, cooler operation, a longer life expectancy, as well as a smoother start-up for the transmission. This invention overcomes the obstacle of controlling the fluid flow through the bypass orifices during the operation and neutral cycles of the hydrostatic transmission.

A feature of the present invention is to provide a hydraulic valve assembly for use in a hydrostatic transmission for controlling fluid transfer between a first, second and third line within a closed-loop circuit, wherein two of the lines define a first and second pressure line and are located at similar longitudinal distances from the remaining line which is rotationally displaced relative to the first and second pressure lines. The valve assembly is comprised of a valve body having a first port for connection to the remaining line, a second port for connection to one of the first and second pressure lines, and a third port for connection to the other of the first and second pressure line, the valve body also includes a spool bore in fluid communication with the first, second and third lines. The valve assembly further includes a valve spool, adapted for sealing reciprocation within the spool bore, having a first end portion, a second end portion, a connecting portion with a cross-sectional area smaller than the cross-section of the first and second end portions, a first bypass orifice within the valve spool extending between the first end portion and the connecting portion, and a second bypass orifice within the valve spool extending between the second end portion and the connecting portion.

The valve spool is movable from a neutral position in which the valve spool is longitudinally centered within the spool bore and where the pressure forces in the first and second pressure lines are substantially similar, to a first position occurring when the pressure forces in the first pressure line is greater than the pressure forces in the second pressure line, or to a second position occurring when the pressure forces in the first pressure line are less than the pressure forces in the second pressure line. During each of these positions, the connecting portion is in fluid communication with at least a portion of the first port. While in the neutral valve spool position, the first bypass orifice is aligned with the first pressure line for fluid communication with the remaining line and the second bypass orifice is aligned with the second pressure line for fluid communication with the remaining line. While in the first valve spool position, the first and second bypass orifices are at least substantially disabled and the connecting portion is in fluid communication with one of the first and second pressure lines. While in the second valve spool position, the first and the second bypass orifices are at least substantially disabled and the connecting portion is in fluid communication with the other of the first and second pressure lines. Dampers are located at both ends of the valve spool for centering the valve spool relative the to the remaining line while in the neutral valve spool position.

In the noted valve assembly the substantially disabling of the first and second bypass orifices occurs as a result of the orifice ends in the valve spool end portions being in a juxtaposed relationship with the valve bore during the first and second position of the valve spool. In one embodiment of the noted valve assembly each of the first and second bypass orifices have a cross-sectional area as large as that of the inlet line. One of the noted valve assemblies utilizes springs for use as the dampers. Also, the volume of fluid transfer, while the valve spool is in the neutral position, is less than the volume of fluid transfer while the valve spool is in one of the first or second positions. During movement of the noted valve assembly, the first and second bypass orifices are disabled simultaneously when the valve spool reaches one of the first and second positions, and the first and second bypass orifices are enabled simultaneously when the valve spool reaches the neutral position.

In one of the noted valve assemblies the first line is an inlet line for a charge pump outlet fluid and the second and third lines are outlet lines. Furthermore, the first port is longitudinally centered relative to the second and third ports. This valve assembly includes a length of the first bypass orifice, located in the valve spool first end portion, having a cross-section smaller than a length of the first bypass orifice located in the valve spool connecting portion, and includes a length of the second bypass orifice, located in the valve spool second end portion, having a cross-section smaller than a length of the second bypass orifice located in the connecting portion. In another version of this noted valve assembly the distance from the connecting portion to the first bypass orifice on the first end of the valve spool is equal to the diameter of the second port, and the distance from the connecting portion to the second bypass orifice on the second end of the valve spool is equal to the diameter of the third port.

In another version of the noted valve assembly the first and second lines are inlet lines and the third line is an exhaust line. In this version, the third port is longitudinally centered between the first and second ports. Also the distance from the connecting portion to the first bypass orifice on the first end of the valve spool is equal to the diameter of the first port, and the distance from the connecting portion to the second bypass orifice on the second end of the valve spool is equal to the diameter of the second port.

Another feature of the present invention includes having a hydraulic valve assembly similar to the previously noted assembly wherein fluid transfer is controlled from a single inlet line to a first and second outlet line within a closed-loop assembly. The valve assembly is comprised of a valve body having a first port connected to the inlet line, a second port connected to the first outlet line, a third port connected to the second outlet line, and a spool bore in fluid communication with the inlet line, first outline line and the second outlet line. This assembly is further comprised of a unitary valve spool, adapted for sealing movement within the spool bore, having a first end portion, a second end portion and a connecting portion having a cross-sectional area smaller than that of the first and second end portions, the valve spool having at least one orifice in each of the first and second end portions in communication with the connecting portion which is always in fluid communication with at least a portion of the first port. The valve spool is longitudinally movable, via fluid pressure, within the spool bore from a neutral position where the fluid pressure forces acting on the first and second end portions are approximately equal to a first position where the fluid pressure forces acting on the first end portion is greater than the fluid pressure forces acting on the second end portion, or to a second position where the fluid pressure forces acting on the first end portion are less than the fluid pressure forces acting on the second end portion.

The hydraulic valve assembly further includes a first check valve, in physical contact with the first end portion of the valve spool, having a fully open position permitting fluid transfer from the inlet line to the second outlet line when the valve spool is in the second position and having a closed position when the valve spool is in the first position. This assembly also includes a second check valve, in physical contact with the second end portion of the valve spool, having a fully open position permitting fluid transfer from the inlet line to the first outlet line with the valve spool is in the first position and having a closed position when the valve spool is in the second position. Fluid transfer occurs from the inlet line through the orifices in each of the first and second end portions of the valve spool to the first and second outlet lines when the valve spool is in the neutral position, and transfer is substantially stopped through the orifices of both end portions when the valve spool is in either the first or second positions.

This noted valve assembly includes a spool bore comprised of a central first cross-sectional portion interposed between two second larger cross-sectional end portions wherein each intersection between the first and second cross-sectional portions defines a valve seat. In one version of this assembly the check valves are comprised of a check ball and a spring adapted to bias said ball into sealing engagement with an associated valve seat. Movement of the valve spool from the first position to the neutral position or to the second position dislodges the second checkball from its associated valve seat. Movement of the valve spool from the second position to the neutral or first position dislodges the first check ball from its associated valve seat.

Another feature of the present invention includes having a hydraulic system for use with a hydrostatic transmission comprising, in combination, a variable displacement pump, a hydraulic motor, a hydraulic circuit operatively interconnecting the main pump and the motor, a charge pump, within the circuit, having an outlet line, and a valve block, within the circuit, having an inlet line in fluid communication with the charge pump outlet line, and having a first and second outlet line in fluid communication with the hydraulic circuit. The valve block is comprised of a valve body having a first port connected with the inlet line, a second port connected with the first outlet line, a third port connected with the second outlet line, and a spool bore in fluid communication with the inlet, first outlet, and second outlet lines.

This valve block further includes a valve spool, adapted for sealing movement within the spool bore, having a first end portion, a second end portion, and a connecting portion having a cross sectional area smaller than that of the first and second end portions. The valve spool has at least one orifice in each of the first and second end portions in communication with the connecting portion and the connecting portion is in fluid communication with at least a portion of the first port at all times. The valve spool is longitudinally movable, via fluid pressure, within the spool bore from a neutral position where the fluid pressure forces acting on the first and second end portions are approximately equal to a first position where the fluid pressure forces acting on the first end portion are greater than the fluid pressure forces acting on the second end portion, or to a second position where the fluid pressure forces acting on the first end portion are less than the fluid pressure forces acting on the second end portion. The at least one orifice in each of the first and second end portions has fluid flow therethrough when the valve spool is in the neutral position and has substantially no fluid flow therethrough when the valve spool is in either the first or second positions.

The noted valve block also includes a first check valve in physical contact with the valve spool first end portion, having a fully open position when the valve spool connecting portion is in fluid communication with both the inlet line and the first outlet line thus permitting fluid transfer from the inlet line to the first outlet line when the valve spool is in the second position, and having a closed position when the valve spool is in the first position. The valve block further includes a second check valve in physical contact with the valve spool second end portion, having a fully open position when the valve spool connecting portion is in fluid communication with both the inlet line and the second outlet line thus permitting fluid transfer from the inlet line to the second outlet line when the valve spool is in the first position, and having a closed position when the valve spool is in the second position.

Another version of the noted hydraulic system includes valve spool orifices that are at least substantially disabled simultaneously when the valve spool reaches one of the first and second positions, and are enabled simultaneously when the valve spool reaches the neutral position. In the noted system the first port is longitudinally centered relative to the second and third ports.

Another feature of the present invention includes a method for increasing the width of the dead band of the hydrostatic transmission in a neutral mode of operation without impairing the performance of the hydrostatic transmission in non-neutral modes of operation, where the hydrostatic transmission includes a variable displacement main pump, a hydraulic motor, a hydraulic circuit operatively interconnecting the main pump and the motor, a charge pump interconnected within the circuit having an outlet line, and a valve block operatively interconnected with the circuit. The valve block, which has an inlet line in communication with the charge pump outlet line and a first and a second outlet line in communication with the hydraulic circuit, further includes a valve body having a first port connected with the inlet line, a second port connected with the first outlet line, and a third port connected with the second outlet line. The valve block also includes a valve spool adapted for sealing longitudinal movement within the spool bore, having a first end portion, a second end portion and a connecting portion having a cross-sectional profile smaller than that of the first and second portions. Dampers center the valve spool in a neutral mode of operation.

The method comprises: including a first bypass orifice within the valve spool extending between the first end portion and the connecting portion; including a second bypass orifice within the valve spool extending between the second end portion and the connecting portion; keeping the connecting portion in fluid communication with the first port at all times; permitting substantially equal fluid flow from the first port, via the first and second bypass orifices, to the first and second outlet ports, respectively, in the neutral mode of operation when the fluid forces acting on the first and second end portions are about equal; and shifting the valve spool from the neutral mode of operation to the non-neutral mode of operation during which the fluid forces acting on the first and second end portions are unequal, to thereby at least substantially disable the fluid flows via the first and second bypass orifices while simultaneously permitting fluid flows from the inlet line to one of the first and second outlet ports.

The noted method also includes locating the valve spool in a first position where the pressure in the first outlet line is greater than the pressure in the second outlet line and in which fluid flows from the inlet line to the second outlet line, or locating the valve spool in a second position where the pressure in the first outlet line is less than the pressure in the second outlet line and in which fluid flows from the inlet line to the first outlet line. The noted method further includes preventing cavitation within the hydraulic circuit when the fluid flows from the inlet line to one of the first and second outlet ports.

BRIEF DESCRIPTION OF THE DRAWINGS

FIG. 5a is an enlarged version of the elliptical area circumscribed in FIG. 5, showing the two check valves, two bypass orifices, and directional valve in greater detail.

FIG. 5b is an elevational view of the valve spool of one embodiment of the present invention.

FIG. 6a is a cross-sectional view of the special valve block of FIG. 6 shown in the position where the fluid pressure in line 23 exceeds the fluid pressure in line 24.

FIG. 6b is a cross-sectional view of the special valve block of FIG. 6 shown in the position where the pressure in line 24 exceeds the pressure in line 23.

FIG. 12 is a graph showing the efficiencies of a 10 cc pump, as part of the closed-loop circuit, utilizing the special valve block of this invention as illustrated in FIGS. 4, 5 and 6.

DETAILED DESCRIPTION OF THE PREFERRED EMBODIMENT

Figure 1:
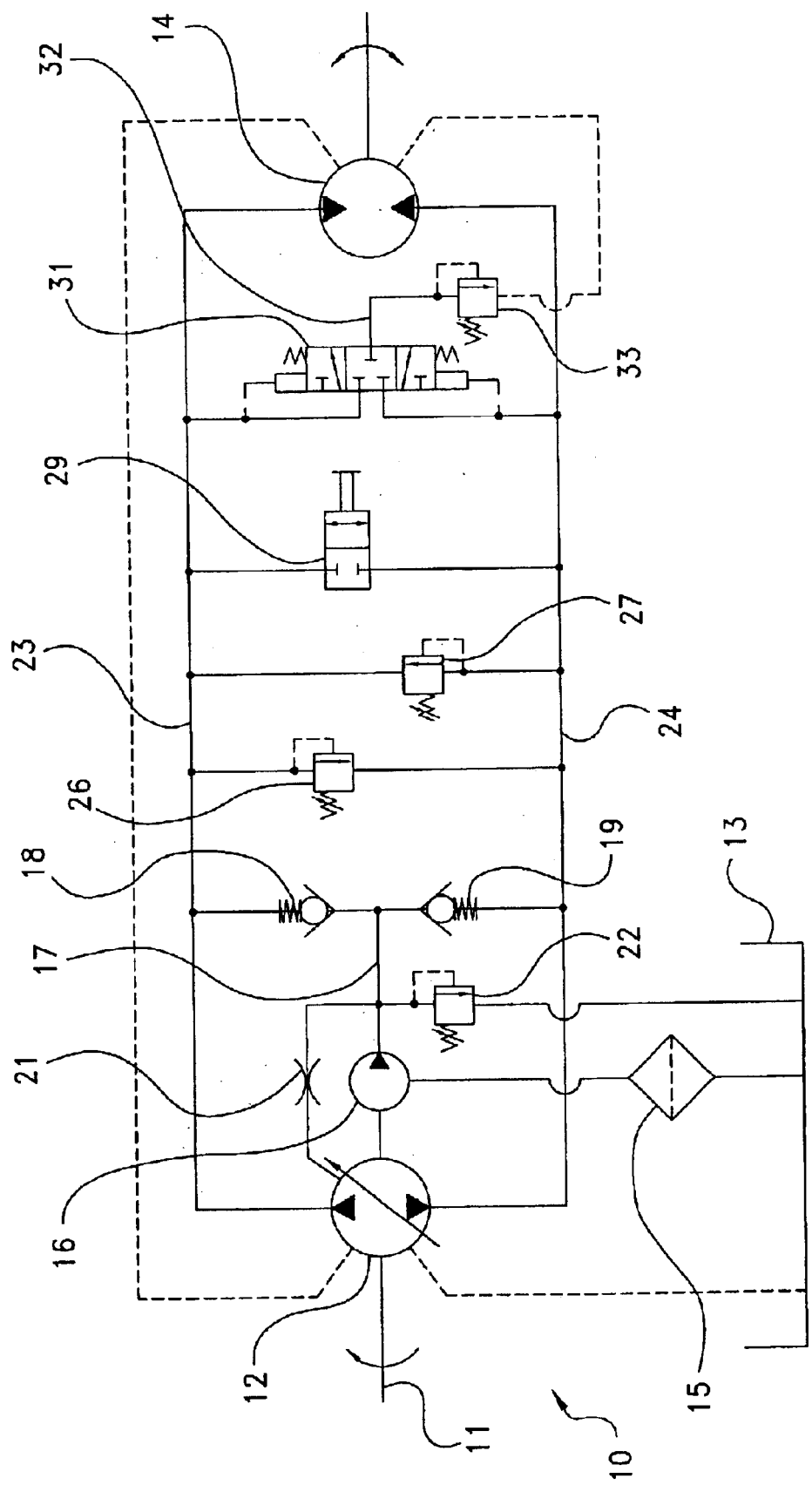
FIG. 1 is a hydraulic schematic of a typical prior art hydrostatic transmission closed-loop circuit.

FIG. 1 shows a schematic of a typical prior art hydrostatic transmission closed-loop circuit 10 consisting of a variable displacement main pump 12 and a hydraulic motor, such as a fixed displacement motor 14, connected to each other by lines 23 and 24. Pump 12 can be an over center axial piston or bent-axis piston pump. With an over center variable displacement axial piston pump, the displacement of the pump is determined by the size and number of pistons, as well as the stroke length. An input shaft 11 for pump 12 is driven by a prime mover (not shown), such as an internal combustion engine or an electrical motor, at a predetermined speed in a predetermined direction. Although the size and number of pistons are fixed, changing the piston stroke length can change the displacement of the pump. The stroke length is determined by the angle of pump's 12 swashplate, which can be tilted by any corresponding stroke controlling device, for example a trunnion shaft (not shown). The trunnion shaft is connected to a control handle through a linkage installed in the machine. When an operator pushes the handle forward, pump 12 delivers flow for one direction of motor 14 operation. Changing the displacement of pump 12 will change its output flow rate, which controls the speed of motor 14. Moving the swashplate or yoke (not shown) of pump 12 overcenter will automatically reverse the flow out of pump 12, thus reversing the direction of motor 14. Depending on the direction of the overcenter movement of the pump swashplate (or yoke) line 23 (or line 24) can be a high pressure supply line or a low pressure return line.

A charge pump 16, also driven via input shaft 11, supplies additional hydraulic fluid to closed-loop circuit 10 at the rate of approximately 10–30% of the flow rate that main pump 12 can deliver. Charge pump 16 draws fluid from a reservoir 13 which can be passed through a filter 15 and supplies this fluid into closed-loop circuit 10 through a conduit line 17 by way of one-way check valves 18 and 19 to compensate for any possible flow loss due to internal leakage. Charge pump 16 also continuously provides fluid flow for cooling main pump 12 through a conduit line including a cooling orifice 21 during the operation of main pump 12. A charge pump relief valve 22 is used to provide a relief path to reservoir 13 when more than required flow from charge pump 16 cannot enter closed loop circuit 10, and also regulates the pressure of the low pressure side of circuit 10. Relief valves 26 and 27 are positioned between lines 23 and 24 and protect each line from pressure overload during the operation. Valve 26 provides relief for line 23 and valve 27 provides relief for line 24.

In certain applications, closed-loop circuit 10 will also have a bypass valve 29 positioned between lines 23 and 24 in order to transfer oil from one line to the other. The use of bypass valve 29 will enable motor 14 to turn over with little resistance when it is desirable, for example, to move a machine for a short distance without operating the transmission. Again, in certain applications, a hot-oil shuttle valve 31 is provided to reduce the loop temperature by connecting the low pressure side of closed-loop circuit 10 to a drain line. This valve allows a certain percentage of the hot oil discharging from motor 14 to flow back to reservoir 13 for cooling and filtering, and replaces the discharged hot oil with cooled, filtered oil from charge pump 16. Line 32 connects a forward/reverse charge pressure relief valve 33 with hot oil shuttle valve 31 to provide a lower resistance on the low pressure side of closed-loop circuit 10. Relief valve 33 maintains a certain amount of fluid pressure on the low pressure side of circuit 10. Since charge pump relief valve 22 is in parallel with relief valve 33, charge pump relief valve 22 should be set at a pressure higher than that of relief valve 33. When the transmission is in neutral and hot oil shuttle valve 31 is centered, charge pump flow is relieved over relief valve 22.

Figure 2:
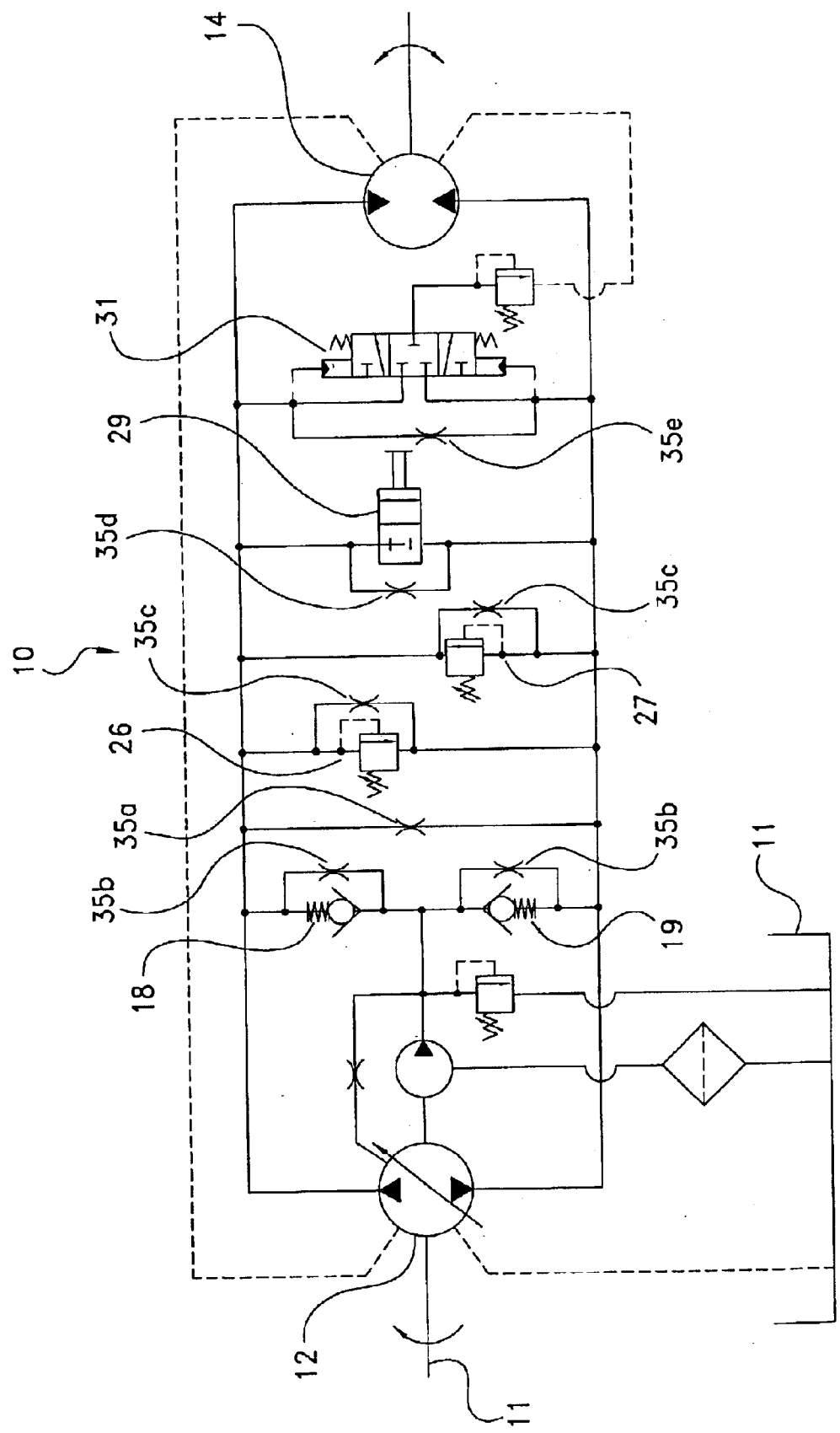
FIG. 2 is a hydraulic schematic of a typical prior art hydrostatic transmission closed-loop circuit having a fixed bypass orifice interposed between both sides of the closed-loop, as well as, in the alternative, having fixed orifices integrated into other hydraulic components of the hydrostatic transmission.

In order to avoid a rough, jerky start of the machine (in the forward or reverse direction), a fixed orifice 35a, shown in FIG. 2 and interposed between the high and low pressure sides of circuit 10, can be used to widen the width of the dead band of the hydrostatic transmission. The dead band of a hydrostatic transmission can be defined as the non-response range of the transmission near its neutral position where motor 14 will not be turned due to internal cross-port leakage of the transmission at very low fluid flow, near the neutral swashplate position. Adding an orifice, such as orifice 35a, creates a bypass flow passage in the closed-loop. Increasing the dead band of the transmission allows the machine to start moving smoothly when the transmission is originally at neutral position. The size of orifice 35a is important and the optimum diameter is generally determined by carefully checking the change of stoking effects on the machine due to the change of orifice diameter. Normally the orifice diameter is in the range of 0.5 to 1.0 mm. Two fixed orifices 35b can also be integrated into other hydraulic components of the hydrostatic transmission, as also shown in FIG. 2. For example, in lieu of using previously described interposed fixed orifice 35a, fixed orifices 35b are integrated into system check valves 18 and 19. If desired, fixed orifices 35c are integrated into high pressure relief valves 26 and 27. Furthermore fixed orifice 35d can be integrated into bypass valve 29. Finally fixed orifice 35e can be integrated into hot oil shuttle valve 31.

Although hydrostatic transmissions with the noted fixed orifices 35a to 35e, as shown in FIG. 2, help a machine obtain smooth operation near its neutral position, there are several drawbacks. The use of one or more of fixed orifices 35a to 35e provide a flow path from the high pressure side to the low pressure side of closed-loop circuit 10 during all phases of the transmission's operation. While a fixed orifice 35a to 35e enhances smooth operation near the neutral position of the hydrostatic transmission, it also hinders the operation, when not in the neutral position, by continuing to allow a certain amount of fluid flow once the machine is operating. This then unwanted cross-port leakage reduces the overall efficiency of the hydrostatic transmission since the effective capacity of flow delivery of pump 12 is decreased. Cross-port leakage also generates substantial heat, which has the negative effect of increasing the operating temperature of closed-loop circuit 10. This excessive operating temperature is not only a safety issue for machine operators, but also reduces the service life of the machine. Adding an additional oil cooling device not only increases the cost of the machine, but also adds complexity and may encumber possible space and location limitations.

Figure 3:
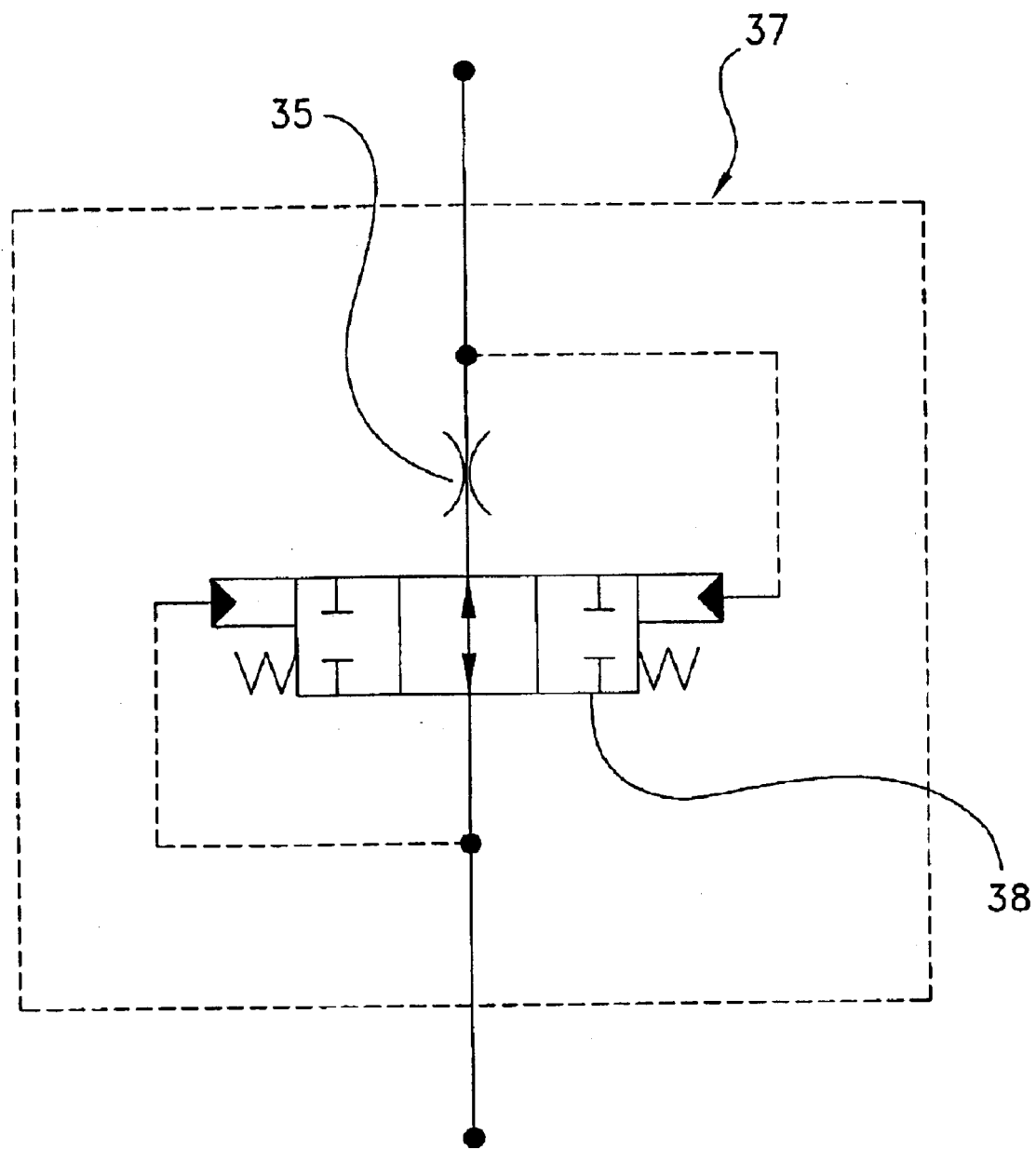
FIG. 3 is a hydraulic schematic of a special valve block of the present invention having a directional valve and a bypass orifice.

It is thus desirable that an orifice performs its "cross-port bypassing" function only near the neutral or dead-band position of the hydrostatic transmission and that thereafter the orifice be disabled during continuous operation of the machine away from the neutral or dead-band position. FIG. 3 shows a schematic of a special valve block 37 having a directional valve 38 with an orifice 35. Movement of directional valve 38 away from its neutral, or centered, position disables orifice 35. This orifice disablement occurs during normal operation of the hydrostatic transmission and significantly increases the efficiency of the transmission and substantially reduces the working or operating temperature of closed-loop circuit 10.

Figure 4:
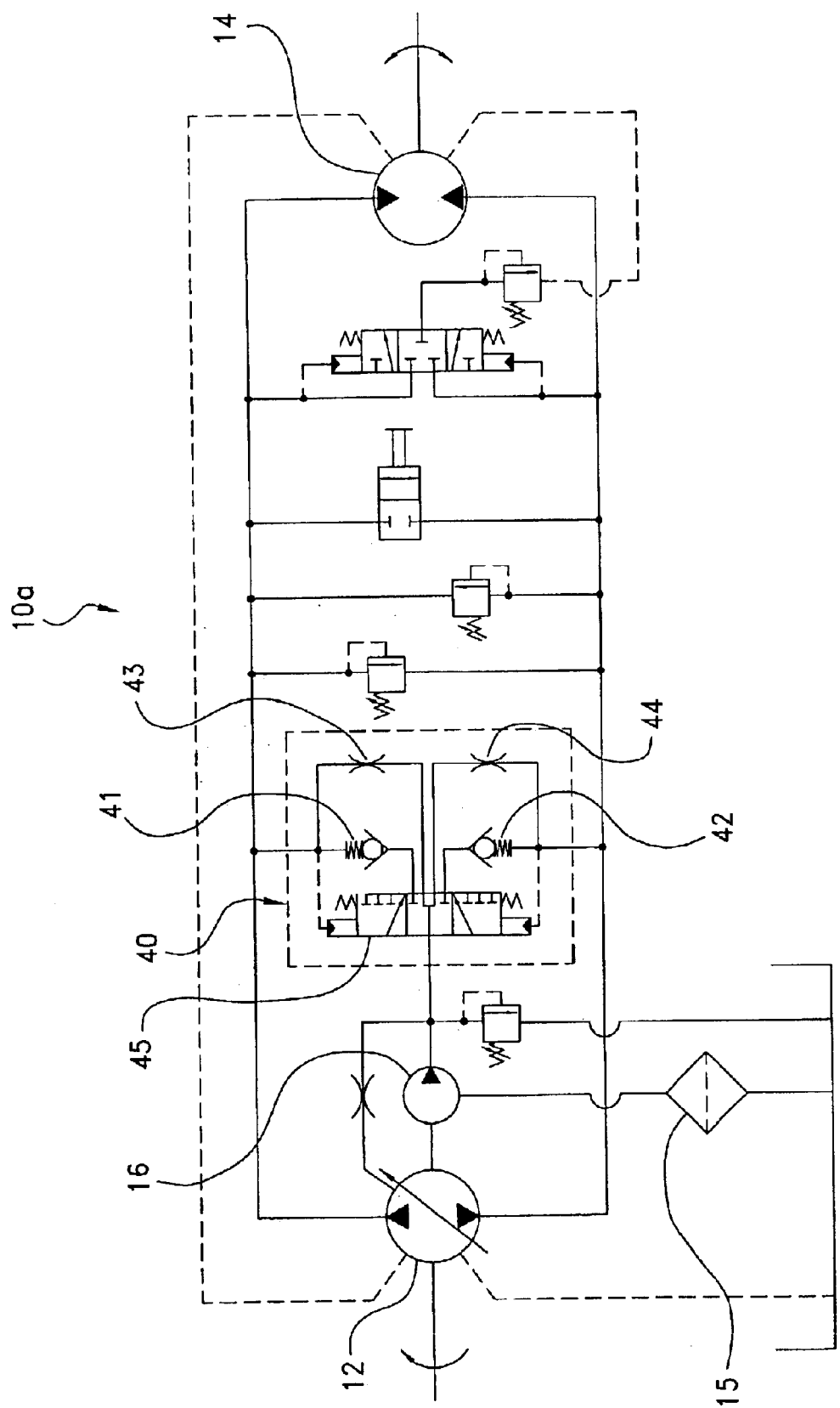
FIG. 4 is a hydraulic schematic diagram of a first embodiment of the present invention showing a hydrostatic transmission closed-loop circuit with a special valve block, consisting of two check valves, two bypass orifices, and a directional valve.

FIG. 4 shows a schematic diagram of a hydrostatic transmission closed-loop circuit 10a with an integrated special valve block 40. The componentry of circuit 10a is similar to the aforementioned closed-loop circuit 10 in FIG. 1 with the addition of special valve block 40, in the former, in place of check valves 18 and 19 in the latter. Therefore, the numbering of the remaining componentry in FIG. 4 will be the same as that in FIG. 1. Valve block 40 is comprised of two check valves 41 and 42, two orifices 43 and 44, and a directional valve 45. During operation, charge pump 16 fills both sides of the loop with hydraulic fluid through orifices 43 and 44 when the system operates in its neutral position. A slight amount of swashplate movement caused by operation of the control by an operator will cause main pump 12 to pump fluid into the corresponding side of the loop. Motor 14 will not yet rotate because this flow is so small that it will bypass motor 14 through orifices 43 and 44 and other internal leakage paths in the system without significant pressure build-up. As the operator continues to increase the swashplate angle, the increased fluid pressure will start to turn motor 14. At that point directional valve 45 shifts so that orifices 43 and 44 are disabled and the appropriate low pressure check valve, either 41 or 42, is opened. Charge pump 16 then continuously replenishes the closed-loop on the low pressure side through the open check valve, 41 or 42, with fluid, thus making up for internal leakage throughout the closed-loop. A supply of fluid to the low pressure side also prevents cavitation, which may occur at the pump inlet from a lack of fluid pressure.

Figure 5:
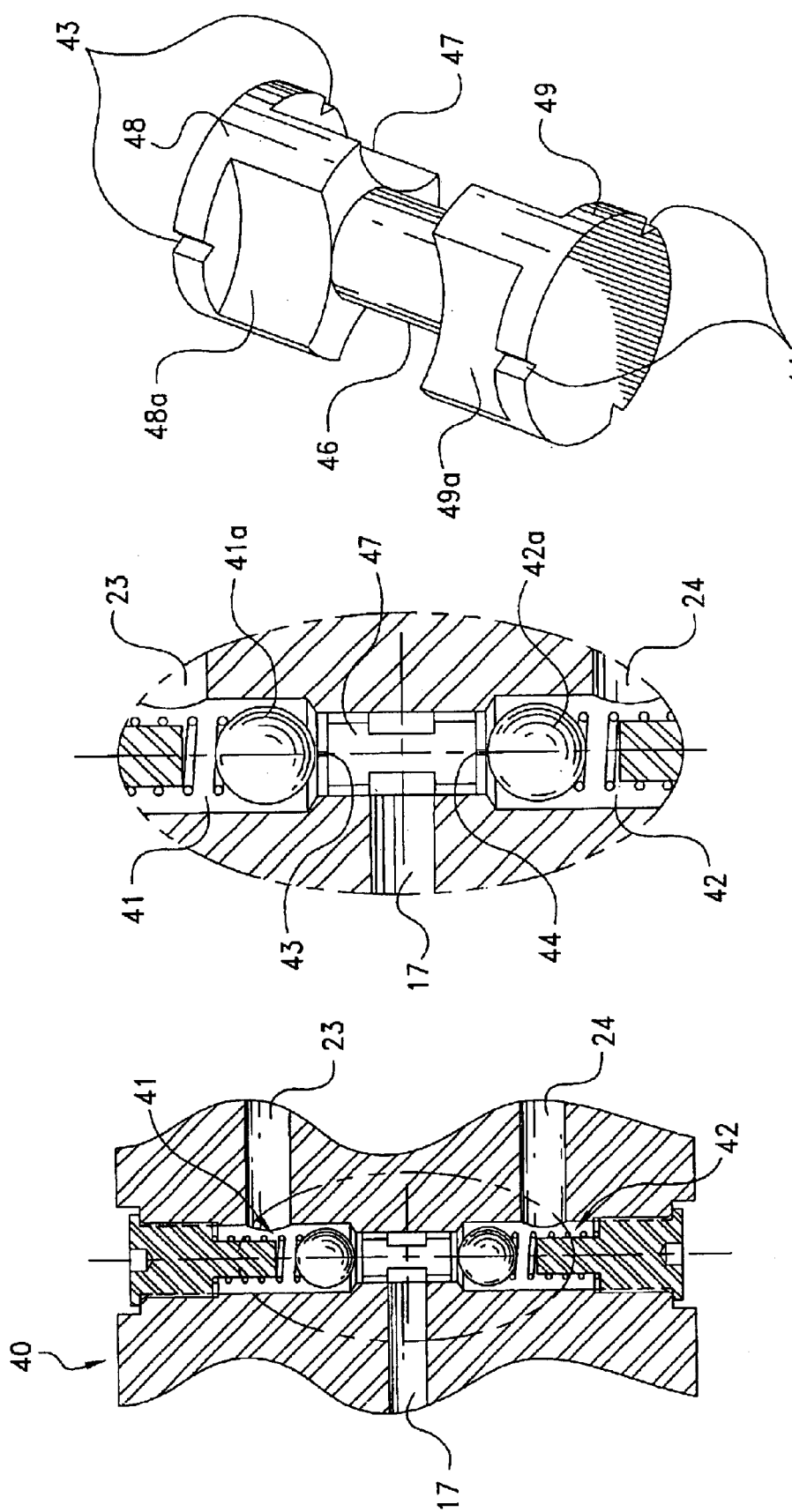
FIG. 5 is a cross-sectional view of the actual design of the special valve block schematically shown in FIG. 4.

FIGS. 5 and 5a show the actual design of a valve block 40, schematically shown in FIG. 4, as having orifices 43 and 44 which can be disabled after the start-up of the motor. Valve block 40 is comprised of a valve spool 47, shown in detail in FIG. 5b, having two opposed generally cylindrical end portions 48 and 49 with at least one, but preferably multiple equally spaced orifices 43 and 44 in end portions 48 and 49 respectively. Orifices 43 and 44, which may be of any desired shape, are illustrated in FIG. 5b as being generally triangular in cross section, and are located in a peripheral band portion on the outermost edge of end portions 48 and 49. Similarly orifices 43, 44 can be placed on other locations on the end portions 48, 49 as long as the disabling function occurs. Valve spool 47, whose end portions 48, 49 also include relieved portions 48a, 49a respectively are interconnected by a smaller central cross-sectional area columnar portion 46, with valve spool 47 being interposed between opposed spring-loaded check valves 41 and 42 as best seen in FIG. 5a. If so desired, orifices 43 and 44 may extend along the full longitudinal extent of valve spool end portions 48 and 49. The design of check valves 41 and 42 is simple and inexpensive and allows low cost spheres or balls 41a and 42a to be used as check valve poppets. The use of steel balls 41a and 42a improves the reliability of sealing of check balls and reduces the cost of valve seat manufacturing compared with other types of valve poppets.

Figure 6:
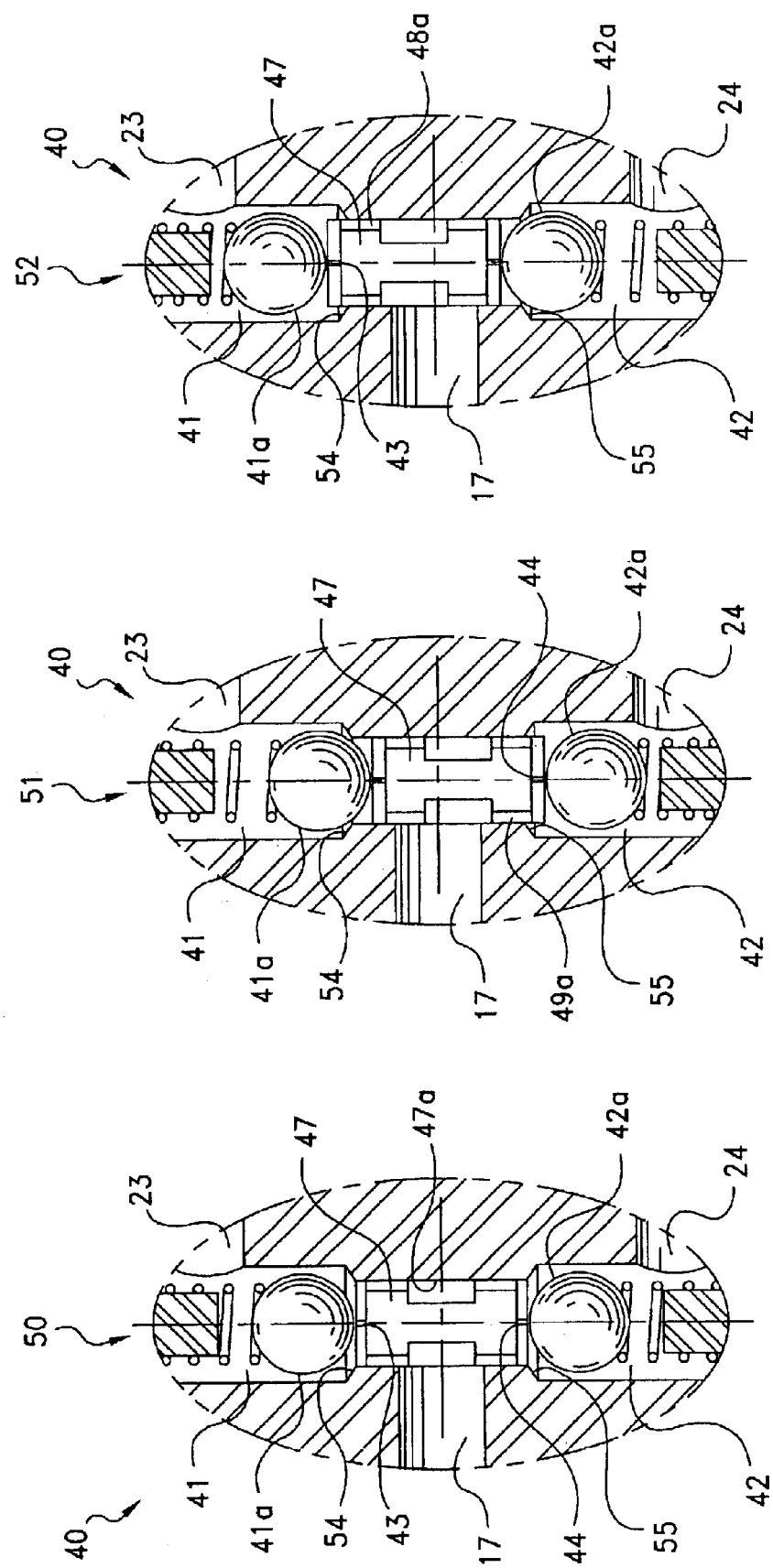
FIG. 6 is a cross-sectional view, substantially similar to that of FIG. 5, showing the special valve block in its neutral position, where the fluid pressure in lines 23 and 24 are approximately equal.
Figure 7:
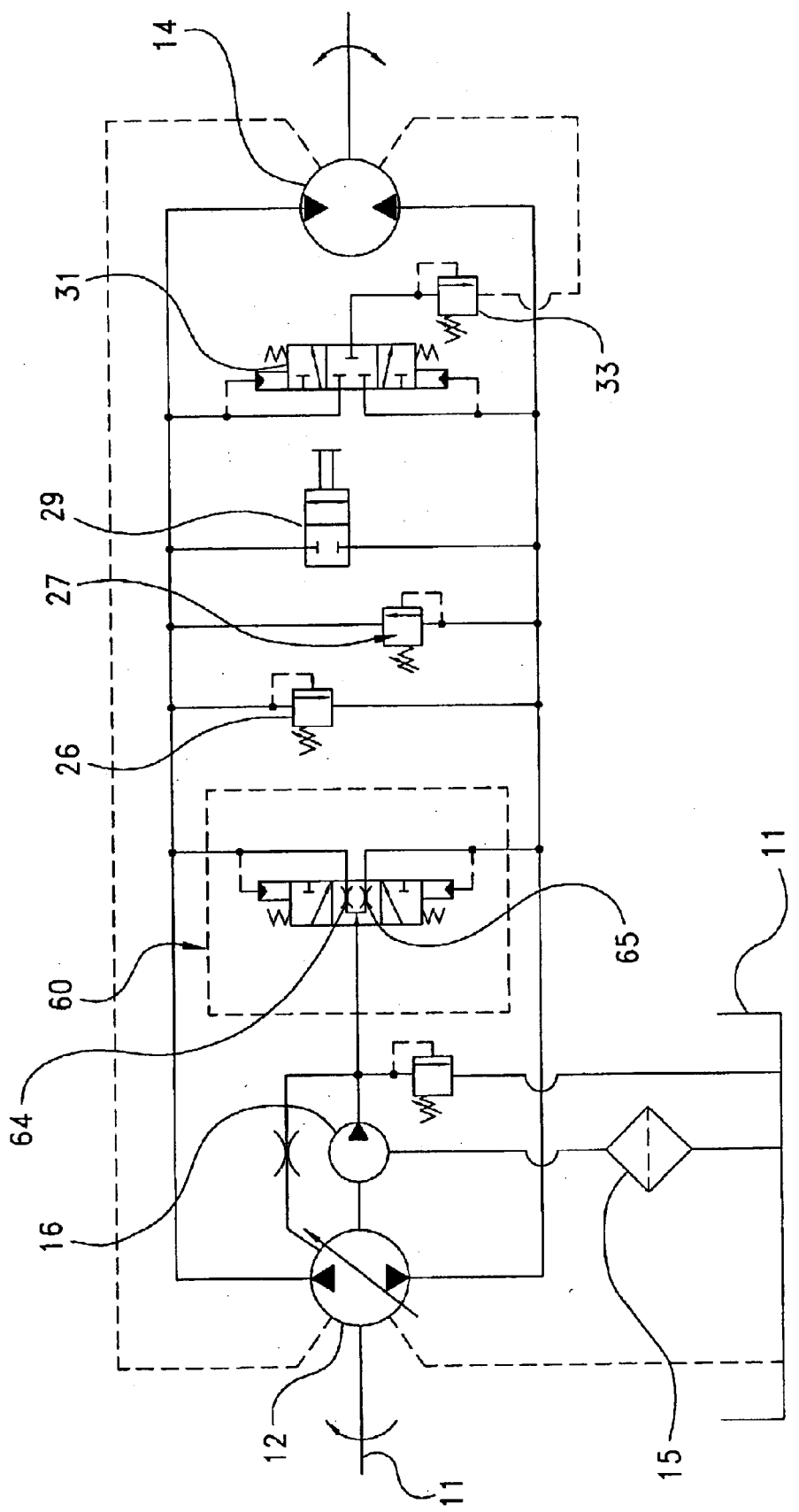
FIG. 7 is a hydraulic schematic of another embodiment of the present invention showing a hydrostatic transmission closed-loop circuit having a spool type shuttle valve with integrated bypass orifices.

FIGS. 6, 6a, and 6b show all three working positions of valve block 40 when the hydrostatic transmission is operated. Position 50 in FIG. 6 shows valve block 40 in a neutral position, i.e., when charge pump 16 (not shown) is supplying a low pressure fluid through line 17 into an inlet port (not shown) of valve block 40. By virtue of being centered in its associated bore 47a, valve spool 47 positions both check valve balls 41a and 42a off their respective seats 54 and 55 and enables similar fluid flow through both orifices 43 and 44 into lines 23 and 24, respectively, which are connected to outlet ports, not shown, in valve block 40. In this position the fluid pressure in lines 23 and 24 is approximately equal.

Position 51 in FIG. 6a shows valve block 40 in a non-neutral position where the fluid pressure in line 23 is greater than the fluid pressure in line 24. Due to this pressure differential, valve spool 47 pushes check valve ball 42a completely off its associated seat 55, while the spring in check valve 41 pushes ball 41a into full sealing engagement with its associated valve seat 54. Since the movement of valve spool 47 opens check valve 42 there is no energy loss in the system due to the pressure that is typically needed to crack open check valve 42. Since check valve 42 is opened fully, there is substantially less power loss in the system as well. Fluid flow from line 17 will pass through relieved portion 49a of spool 47 and flows past spool cylindrical portion 49 and past valve seat 55 of open check valve 42 into line 24. This fluid flow is necessary since it replenishes any fluid lost due to internal leakage. Continued fluid flow through low pressure line 24 ensures that cavitation does not occur at the pump inlet. Any purported fluid flow towards higher pressure line 23 is stopped by closed check valve 41, and specifically by ball 41a, which is sealingly engaged with valve seat 54. With spool 47 in position 51, charge pump 16 can continuously charge closed-loop circuit 10 on the low pressure side (line 24). Fluid flow from high pressure line 23 cannot pass check valve 41, thus disabling orifices 43 in this direction as well.

Position 52 in FIG. 6b shows valve block 40 in a non-neutral position where the fluid pressure in line 24 is greater than the fluid pressure in line 23. Due to this pressure differential, valve spool 47 pushes check valve ball 41a fully away from seat 54, while the spring in check valve 42 pushes ball 42a against valve seat 55. As a result, charging fluid from line 17 flows through widely opened relieved portion 48a and continues into line 23. Any flow towards line 24 from line 17 will be stopped by check valve 42 which is sealingly engaged with valve seat 55. Likewise any flow from high pressure line 24 cannot pass check valve 42, thus disabling orifices 44. With spool 47 in position 52, charge pump 16 will continuously charge the low-pressure side (line 23) of the closed-loop circuit.

FIGS. 7, 8, 8a–c show another embodiment of the present invention having a valve 60 that performs a function similar to that of the previously described embodiment. Unlike the earlier embodiment where two check valves 41 and 42 are incorporated into valve block 40, valve 60 of this embodiment takes the form of a spool type shuttle valve having a spool 61 sealingly reciprocatable within a bore 61a and having integrated orifices 64 and 65, each having a receiving end always in communication with a central smaller cross-sectional spool mid-portion 66. Similar to the previously described embodiment, valve 60 utilizes springs 62 and 63, which can be compression springs, on opposite ends thereof. Again, like previously described valve block 40, valve 60 communicates the high and low pressure sides of the closed-loop circuit with charge pump 16. At very low fluid flow, near the neutral position of the hydrostatic transmission, as depicted by position 67 in FIG. 8a, leakage across orifices 64 and 65, the discharge ends of which are, in this position, in communication with lines 23 and 24, respectively, ensures that both lines 23, 24 are equally charged. Position 67 shows valve 60 in a neutral position when charge pump 16 (not shown) is supplying low pressure fluid through line 17, which is connected to an inlet port 70 in valve block 40. This low pressure fluid is supplied to both sides of the closed loop through lines 23 and 24, which are connected to outlet ports 71 and 72, respectively, in valve block 40, for loop charging. Centered spool 61 positions both orifices 64 and 65 so that the discharge ends thereof are aligned with lines 23 and 24 respectively. In this position the fluid pressures in lines 23 and 24 are approximately equal.

Figure 8:
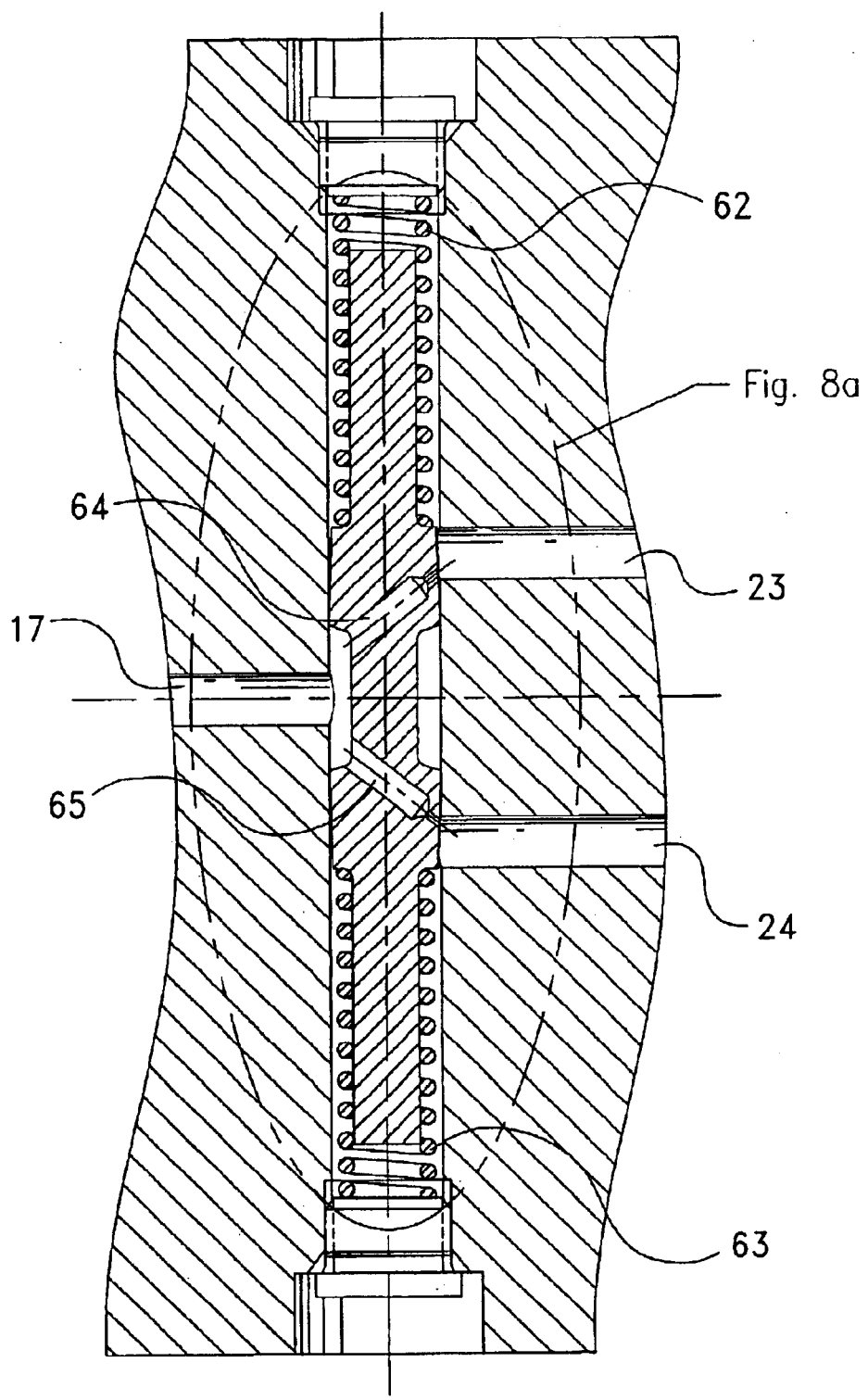
FIG. 8 is a cross-sectional view of the actual design of the spool type shuttle valve schematically shown in FIG. 7.
Figure 8C:
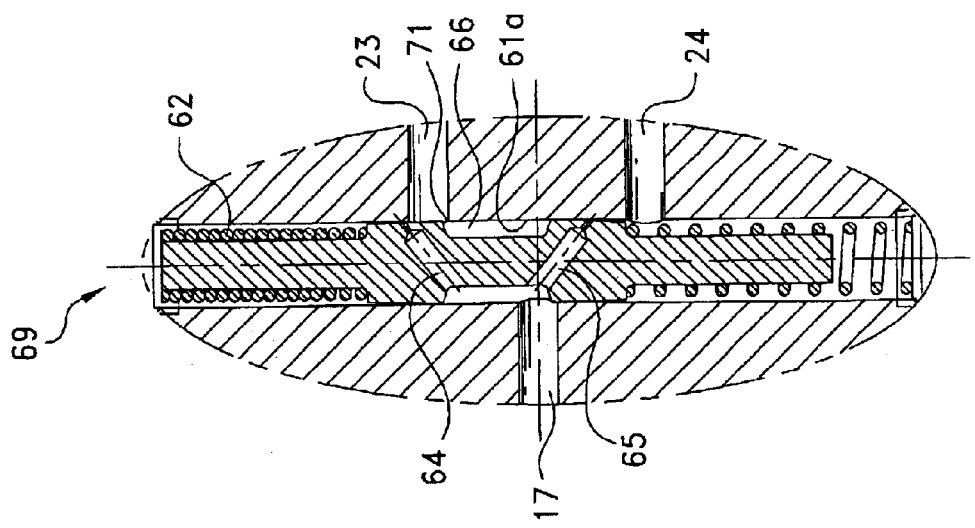
FIG. 8c is a view, similar to that of FIG. 8a, but showing the position of the shuttle valve where the fluid pressure in line 24 exceeds the fluid pressure in line 23.
Figure 8B:
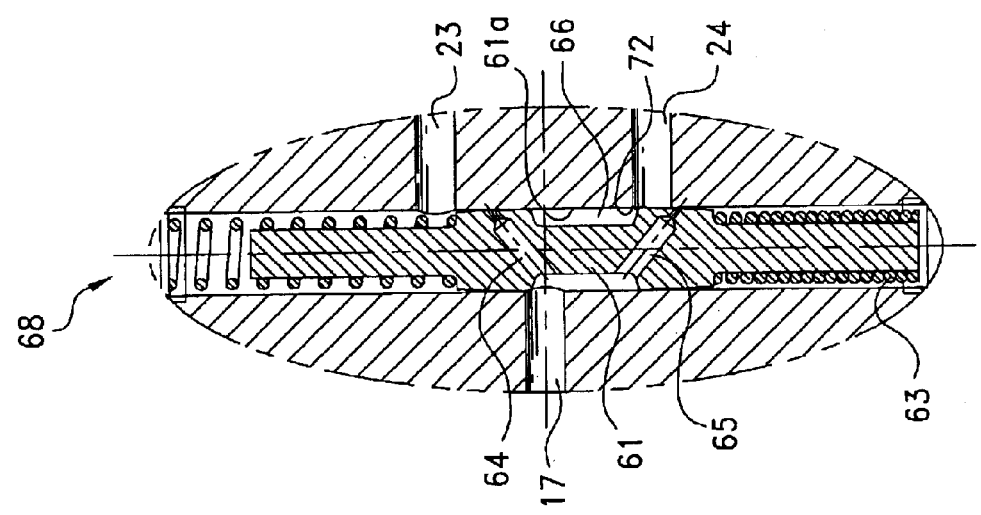
FIG. 8b is a view, similar to that of FIG. 8a, but showing the position of the spool type shuttle valve where the fluid pressure in line 23 exceeds the fluid pressure in line 24.
Figure 8A:
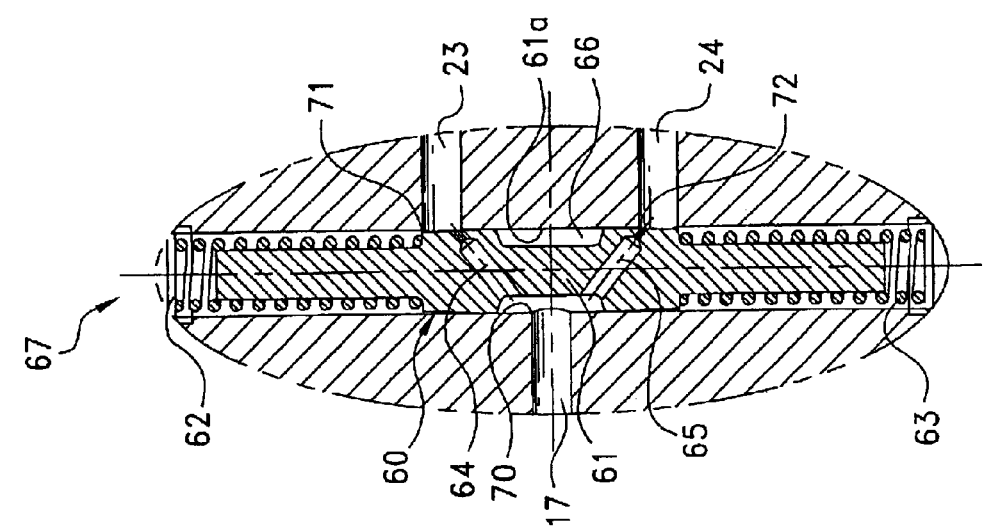
FIG. 8a is an enlarged version of the elliptical area in FIG. 8, showing the neutral position of the spool shuttle valve with integrated orifices and springs on both ends of the spool.

When the operator further pushes/pulls the control handle (not shown) from neutral position 67 shown in FIG. 8a, the increased fluid flow from main pump 12 will increase the pressure differential across valve 60, causing it to shift and thereby disable both orifices 64 and 65 by moving their discharge ends from communication with lines 23, 24 respectively. In non-neutral position 68 in FIG. 8b, where the fluid pressure in line 23 is greater than the fluid pressure in line 24, spool 61 is shown biased towards low pressure line 24. As illustrated, both orifices 64 and 65 are blocked in a juxtaposed position against the wall of valve bore 61a, spring 63 is compressed, and due to the design of spool 61 by virtue of the use of smaller cross-sectional area spool mid-portion 66, line 17 is still able to be in fluid communication with line 24. Fluid flow from line 17 will pass through spool mid-portion 66 and flow into low pressure line 24. With spool 61 in position 68, charge pump 16 can continuously charge the closed-loop circuit on the low pressure side, thus replenishing the circuit with fluid that may have been lost due to internal leakage. As previously noted spool mid-portion 66 provides a wide opening for fluid flow to low pressure line 24, thereby allowing ample fluid into line 24 in order to minimize any power loss. The distance from the discharge end of orifice 65 to spool mid-portion 66 is substantially the same as the diameter of port 72. Therefore there is no interruption of fluid flow to line 24 when valve 60 shifts in this direction. Fluid will flow from orifice 65, then from spool mid-portion 66 during this transition.

When the operator pushes/pulls the control handle (not shown) from the neutral position 67 shown in FIG. 8a in the direction in opposition to that of position 68 shown in FIG. 8b, the pressure differential in lines 23–24 will cause valve 60 to shift towards line 23, which now becomes the low pressure line. Position 69 in FIG. 8c shows valve 60 in a position where the fluid pressure in line 24 is greater than the fluid pressure in line 23. Both integrated orifices 64 and 65 are again blocked in a juxtaposed position against the wall of valve bore 61a, spring 62 is compressed, and line 17 is able to be in fluid communication with line 23 through spool midportion 66. Fluid from line 17 can thus only flow through spool mid-portion 66 into low pressure line 23. As previously noted, due to the design of spool 61 all fluid flow to line 24 is now blocked. With spool 61 in position 69, charge pump 16 will continuously charge the low-pressure side (line 23) of the closed-loop circuit to minimize power loss. The distance from the discharge end of orifice 64 to spool mid-portion 66 is substantially the same as the diameter of port 71 in valve block 40. Therefore there is no interruption of fluid flow to line 23 when the valve shifts in this direction.

Figure 9:
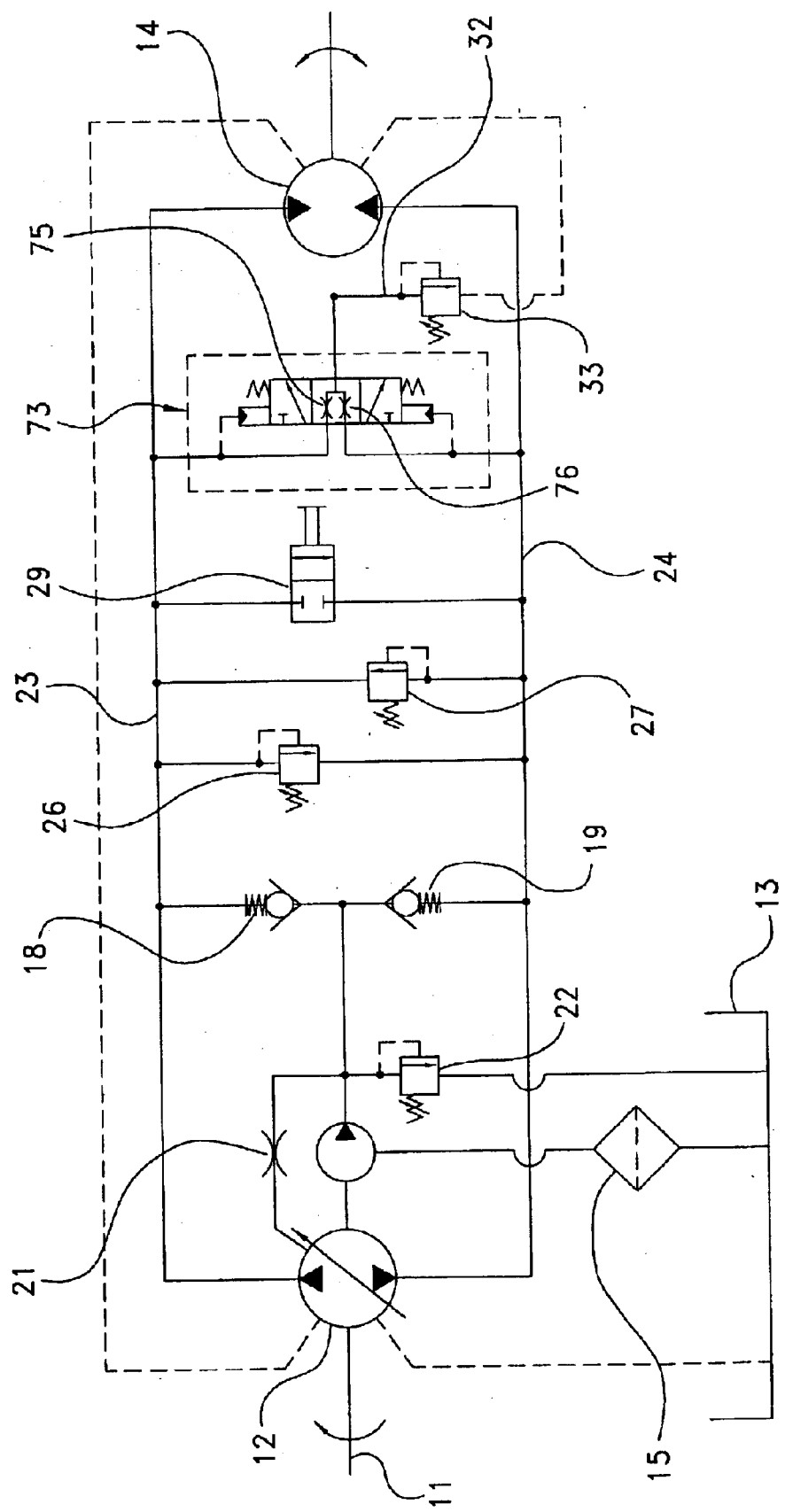
FIG. 9 is a hydraulic schematic of a further embodiment of the present invention showing a hydrostatic transmission closed-loop circuit having a hot oil shuttle valve with integrated bypass orifices.
Figure 10B:
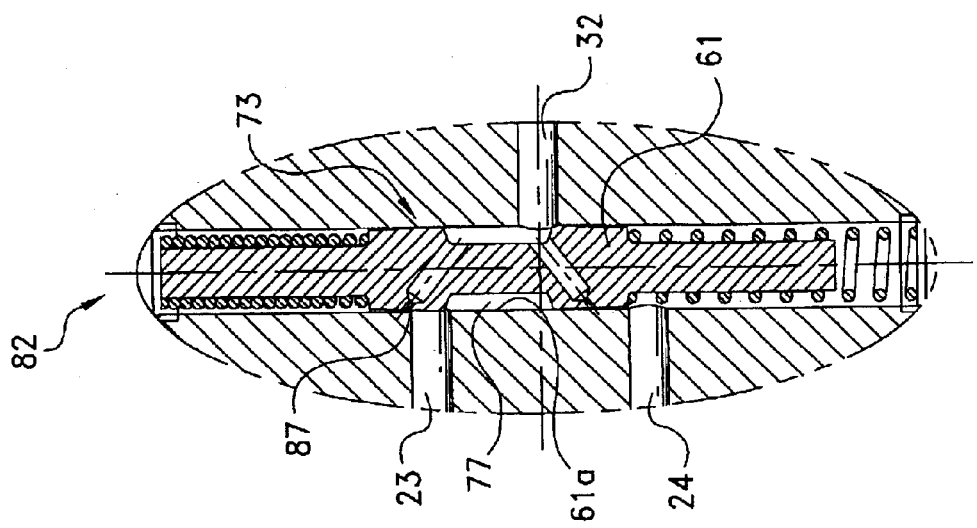
FIG. 10b is a view, similar to that of FIG. 10, but showing the position of the shuttle valve when the fluid pressure in line 24 is greater than the fluid pressure in line 23.

A further embodiment of this invention is schematically shown in FIG. 9 where a hot oil shuttle valve 73, similar to the previously noted hot oil shuttle valve 31 in FIG. 1, herein utilizes integrated orifices 75 and 76. The construction and function of valve 73 is substantially similar to that of previously described valve 60 except that the connecting lines are reversed. While valve 60, in FIG. 8, utilizes one inlet line 17 and two outlet lines 23, 24, valve 73, in FIG. 10, utilizes both lines 23 and 24 for inlet flows while line 32 comprises the single outlet conduit, or exhaust line, connected with relief valve 33. Lines 23 and 24 are connected to inlet ports 87 and 88, respectively, in the valve body, while line 32 is connected to an outlet port 89 in the valve body. Position 80 shows the actual construction and orientation of valve 73 during low fluid flow from charge pump 16 when the fluid pressures in lines 23 and 24 are approximately equal. Valve spool 61 is centered so that the receiving or inlet ends of orifices 75 and 76 are aligned with lines 23 and 24, respectively.

Figure 10A:
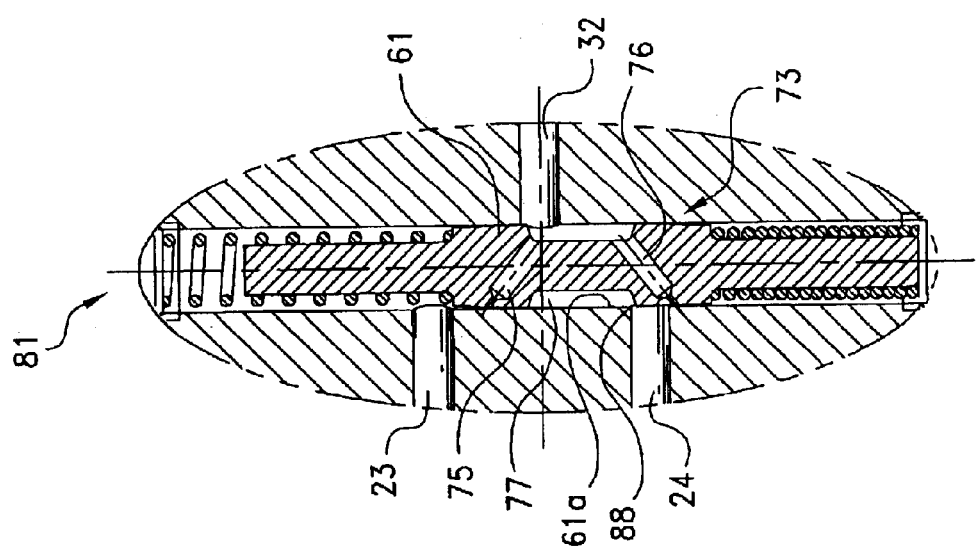
FIG. 10a is a view, similar to that of FIG. 10, but showing the position of the shuttle valve when the fluid pressure in line 23 is greater than the fluid pressure in line 24.
Figure 10:
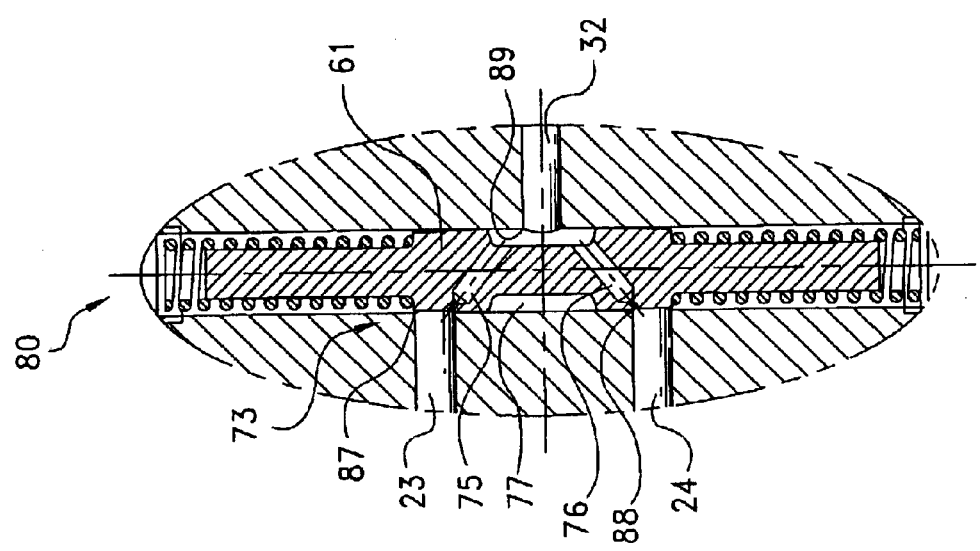
FIG. 10 is an elliptical cross-sectional view of the actual design of the hot oil shuttle valve schematically illustrated in FIG. 9 showing the hot oil shuttle valve with integrated orifices and springs on both ends of the valve in a neutral position.

Referring to FIG. 10a, when the operator activates the stroke controlling device in one direction in order to initiate turning of the motor 14, main pump 12 will pump fluid into the corresponding side of the loop, either line 23 or 24. When the increased fluid pressure reaches a predetermined or set value sufficient to turn motor 14, valve 73 will shift, as shown in non-neutral position 81, so that orifices 75 and 76 are disabled, or shut-off in a juxtaposed position against the wall of valve bore 61a, and fluid can flow through low pressure line 24. Charge pump 16 then continuously charges the closed-loop on the low pressure side through line 24. Fluid flowing through low pressure line 24 ensures that cavitation does not occur in the hydrostatic transmission system. The distance from the inlet end of orifice 76 to a mid-portion 77 in valve 73 is substantially the same as the diameter of port 88. Therefore there is no interruption of fluid flow from line 24 when valve 73 shifts in this direction. Fluid will flow from line 24 to orifice 76, then to mid-portion 77 during this transition.

Referring to FIG. 10b, when the operator changes the direction of movement of the control handle, main pump 12 will alter the direction of the fluid flow. When the pressure differential between lines 23 and 24 reaches a predetermined value, valve 73 will move to position 82. In position 82, the fluid pressure in line 24 is greater than the fluid pressure in line 23, thus biasing spool 61 towards low pressure line 23. As in position 81 (FIG. 10a), both orifices, 75 and 76, are disabled in a juxtaposed position against valve bore 61a and pressurized fluid can only reach line 32 through low pressure line 23. The distance from the inlet end of orifice 75 to mid-portion 77 in valve 73 is substantially the same as the diameter of port 87. Therefore there is no interruption of fluid flow from line 23 when valve 73 shifts in this direction. Fluid will flow from line 23 to orifice 75, then to mid-portion 77 during this transition.

In all hydrostatic transmissions, two check valves are used in order to enable the charge pump to replenish the closed-loop system with fluid during operation. The high pressure side check valve closes while the low pressure side check valve opens allowing for the replenishing fluid to flow into the closed loop. It is undesirable for the replenishing fluid from the charge pump to encounter the resistance of a spring, causing cracking pressure, at the backside of the check valve. Overcoming this cracking pressure of the check valve requires pressure from the charge pump supply. All the embodiments of this invention provide the unique valve design that allows for simultaneous opening of the low pressure side check valve and closing of the high pressure side check valve, while disabling the orifices which perform the desired fluid bypass function when the main pump is at its neutral position. This combination significantly improves the performance efficiency of the hydrostatic transmission not only by eliminating the unwanted cross-port fluid bypass or leakage at normal operation, but also by eliminating the cracking pressure of the make-up check valves. This fluid bypass feature provides a smooth transition of the motor while moving from neutral into forward or reverse motion. The instantaneous opening of the low pressure side check valve also prevents unwanted noise, which may result from pump cavitation due to fluid starvation.

Figure 11:
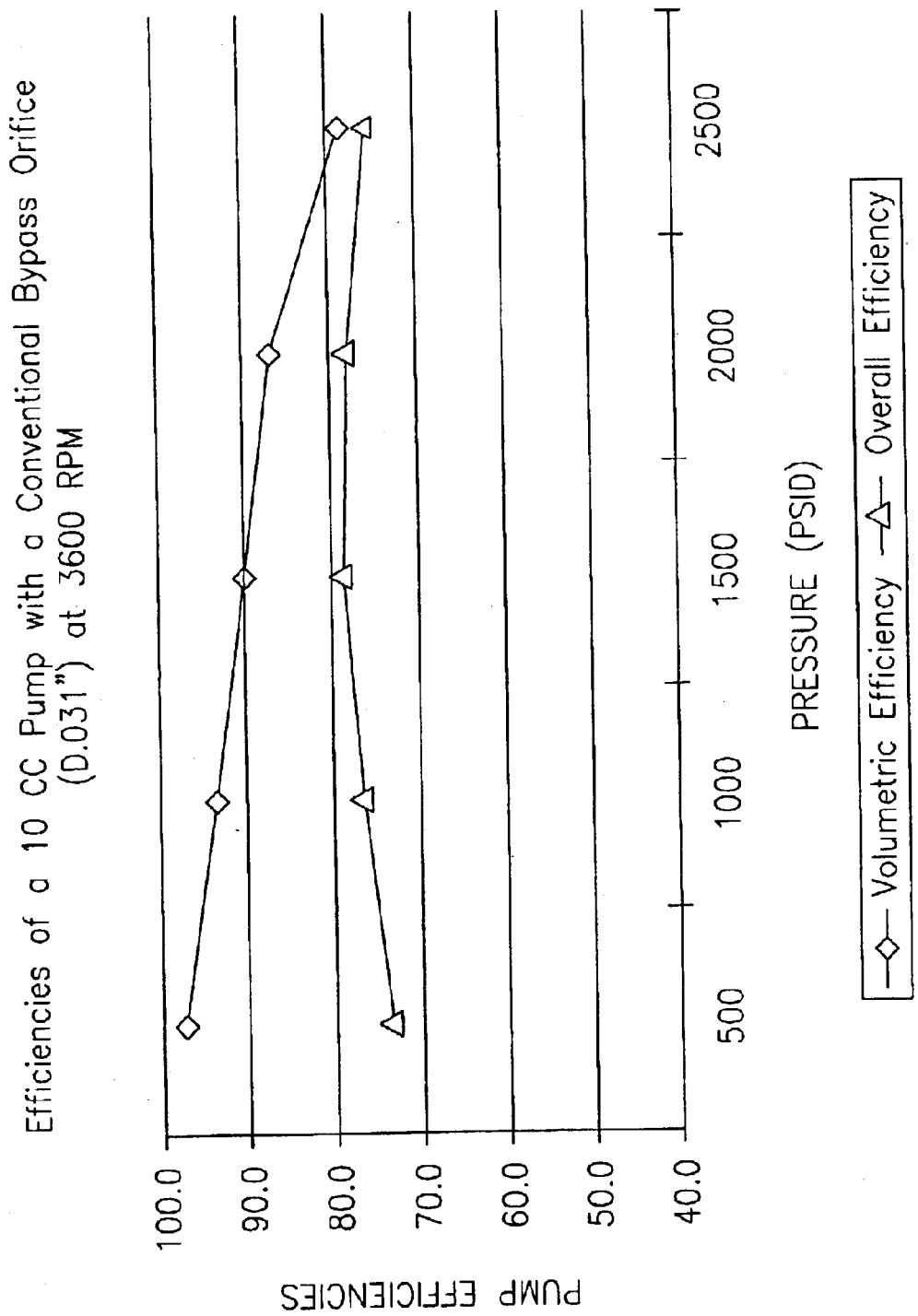
FIG. 11 is a graph showing the efficiencies of a 10 cc pump, as part of the closed-loop circuit, utilizing a conventional bypass orifice.

FIGS. 11 and 12 illustrate the change of performance efficiencies of two 10 cc pumps with respect to the differential pressure between inlet and outlet ports. FIG. 11 shows the test results of a commercially available pump having a fixed 0.031" orifice on a make-up check valve. FIG. 12 shows the test results of a pump having a check valve, as detailed in an embodiment of the present invention (shown in FIGS. 4, 5, and 6), comprised of orifice spool 47 (having integral bypass orifices 43 and 44) interposed between two make-up check valves, 41 and 42 in valve block 40. Comparing FIG. 12 to FIG. 11, the use of special valve block 40 significantly increases the performance of a hydrostatic pump at normal operational conditions, while still maintaining a bypass function near the neutral position for smooth transition of motor 14, from neutral to operating, near zero speed. Specifically, for the conventional bypass orifice-equipped pump the efficiencies, illustrated in FIG. 11, show a decrease in pump volumetric efficiency from about 98% at 500 psid to about 79% at 2500 psid, which translates into a drop of about 19%. In contrast thereto, a pump equipped with the disabled bypass orifice 40 (FIGS. 4, 5, and 6) of this invention, in FIG. 12, shows a decrease in pump volumetric efficiency from about 99% at 500 psid to about 95% at 2500 psid, a drop of only about 4.0%, while having its overall efficiency increased from about 78% at 500 psid to about 82% at 2500 psid, an increase of about 5.6%. A comparison of FIGS. 11 and 12 also shows that the noted pump of this invention had an initial overall efficiency of about 78% at 500 psid which is equal to the prior art pump overall efficiency of about 78% at 2500 psid vs. 82% at 2500 psid for the noted pump of this invention. A further comparison of the overall efficiencies of the two designs also shows that the maximum efficiency, 86%, of the pump of this invention occurs at a much greater pressure, 2000 psid, compared with the prior art's pressure of 1500 psid when its peak overall efficiency is but 79%.

It should be noted that the present invention is not limited to the specified preferred embodiments and principles. Those skilled in the art to which this invention pertains may formulate modifications and alterations to the present invention. These changes, which rely upon the teachings by which this disclosure has advanced, are properly considered within the scope of this invention as defined by the appended claims.

What is claimed is:

1. A hydraulic system for use with a hydrostatic transmission comprising in combination:

a variable displacement main pump;

a hydraulic motor;

a hydraulic circuit operatively interconnecting said main pump and motor;

a charge pump, within said circuit, having an outlet line; and a valve block, within said circuit, having an inlet line, in fluid communication with said charge pump outlet line, and having a first and a second outlet line in fluid communication with said hydraulic circuit, said valve block comprising:

a valve body having a first port connected with said inlet line, a second port connected with said first outlet line, a third port connected with said second outlet line, and a spool bore in fluid communication with said inlet, first outlet, and second outlet lines;

a valve spool, adapted for sealing movement within said spool bore, having a first end portion, a second end portion, and a connecting portion having a cross sectional area smaller than that of the first and second end portions, said valve spool having at least one orifice in each of said first and second end portions in communication with said connecting portion, with said connecting portion being in fluid communication with at least a portion of said first port at all times, said valve spool being longitudinally movable, via fluid pressure, within said spool bore from a neutral position to one of a first and second position, wherein the fluid pressure forces, acting on the first and second end portions, are approximately equal in said valve spool neutral position, the fluid pressure forces acting on said first end portion being greater than the fluid pressure forces acting on said second end portion in the first position, and the fluid pressure forces acting on said first end portion being less than the fluid pressure forces acting on said second end portion in the second position, said at least one orifice in each of said first and second end portions having fluid flow therethrough when said valve spool is in said neutral position and having substantially no fluid flow therethrough when said valve spool is in one of said first and second positions;

a first check valve in physical contact with said valve spool first end portion, having a fully open position when said valve spool connecting portion is in fluid communication with both said inlet line and said first outlet line thus permitting fluid transfer from said inlet line to said first outlet line when said valve spool is in the second position, and having a closed position when said valve spool is in the first position; and a second check valve in physical contact with said valve spool second end portion, having a fully open position when said valve spool connecting portion is in fluid communication with both said inlet line and said second outlet line thus permitting fluid transfer from said inlet line to said second outlet line when said valve spool is in the first position, and having a closed position when said valve spool is in the second position.

2. The hydraulic system in claim 1 wherein said valve spool orifices are at least substantially disabled simultaneously with said valve spool reaching one of said first and second positions, and are enabled simultaneously with said valve spool reaching said neutral position.

3. The hydraulic system in claim 1 wherein said fluid flow through said at least one orifice, in each of said first and second end portions, prevents the inlet pressure to said hydraulic motor from being greater than the outlet pressure from said hydraulic motor.

4. The hydraulic system in claim 1 wherein each of said first and second check valves is comprised of a valve seat, a check ball and a spring adapted to bias said ball into sealing engagement with said valve seat.

5. The hydraulic system in claim 1 wherein said first port is longitudinally centered relative to said second and third ports.

6. A hydraulic valve assembly for controlling fluid transfer from an inlet line to a first and a second outlet line within a closed-loop circuit, said valve assembly comprising:

a valve body defining a first port for connection to said inlet line, a second port for connection to said first outlet line, a third port for connection to said second outlet line, and a spool bore in fluid communication with said inlet line, said first outlet line and said second outlet line;

a unitary valve spool, adapted for sealing movement within said spool bore, having a first end portion, a second end portion, and a connecting portion having a cross-sectional area smaller than that of the first and second end portions, said valve spool having at least one orifice in each of said first and second end portions in communication with said connecting portion, with said connecting portion always being in fluid communication with at least a portion of said first port, said valve spool being longitudinally movable, via fluid pressure, within said spool bore from a neutral position to either a first or second position; wherein the fluid pressure forces acting on the first and second end portions are approximately equal in said valve spool neutral position, the fluid pressure forces acting on said first end portion being greater than the fluid pressure forces acting on said second end portion in the first position, and the fluid pressure forces acting on said first end portion being less than the fluid pressure forces acting on the second end portion in the second position;

a first check valve, in physical contact with said first end portion of said valve spool, having a fully open position permitting fluid transfer from said inlet line to said second outlet line when said valve spool is in the second position and having a closed position when said valve spool is in the first position;

a second check valve, in physical contact with said second end portion of said valve spool, having a fully open position permitting said fluid transfer from said inlet line to said first outlet line when said valve spool is in the first position and having a closed position when said valve spool is in second position; and said fluid transfer occurring from said inlet line through said at least one orifice in each of said first and second end portions of said valve spool to said first and second outlet lines, respectively, when said valve spool is in the neutral position, and having substantially no fluid transfer through said at least one orifice occurring when said valve spool is in one of said first and second positions.

7. The hydraulic valve assembly as in claim 6 wherein the volume of fluid transfer, while said valve spool is in the neutral position, is less than the volume of fluid transfer while said valve spool is in one of the first or second positions.

8. The hydraulic valve assembly as in claim 6 wherein said first port is longitudinally centered relative to said second and third ports.

9. The hydraulic valve assembly as in claim 6 wherein said spool bore is comprised of a central first cross-sectional portion interposed between two second larger cross-sectional end portions wherein each intersection between the first and second cross-sectional portions defines a valve seat.

10. The hydraulic valve assembly as in claim 9 wherein each of said first and second check valves is comprised of a check ball and a spring adapted to bias said ball into sealing engagement with an associated valve seat.

11. The hydraulic valve assembly as in claim 10 wherein movement of said valve spool from said first position to said neutral position or to said second position dislodges said second checkball from its associated valve seat and movement of said valve spool from said second position to said neutral position or to said first position dislodges said first check ball from its associated valve seat.

12. A hydraulic valve assembly for controlling fluid transfer from an inlet line to a first and a second outlet line within a closed-loop circuit, said assembly comprising:

a valve body defining a first port for connection to said inlet line, a second port for connection to said first outlet line, a third port for connection to said second outlet line, and a spool bore in fluid communication with said inlet line, said first outlet line and said second outlet line;

a valve spool, adapted for sealing reciprocation within said spool bore, having a first end portion, a second end portion, a connecting portion with a cross-sectional area smaller than that of the first and second end portions, a first bypass orifice within said valve spool extending from said connecting portion to said first end portion, and a second bypass orifice within said valve spool extending from said connecting portion to said second end portion, said valve spool being movable from a neutral position, in which said valve spool is longitudinally centered within said spool bore relative to said inlet line, occurring when the fluid pressures forces in said first and second outlet lines are substantially similar, to a first position, occurring when the fluid pressure forces in the first outlet line are greater than the fluid pressure forces in said second outlet line, or to a second position, occurring when the fluid pressure forces in the first outlet line are less than the fluid pressure forces in the second outlet line, with said connecting portion being in fluid communication with at least a portion of said first port at each of said positions of said valve spool, wherein: while in said neutral valve spool position, said first bypass orifice is aligned with said first outlet line, said second bypass orifice is aligned with said second outlet line and said connecting portion is centered relative to said inlet line; while in said first valve spool position, said first and second bypass orifices are at least substantially disabled, and said connecting portion is in fluid communication with said inlet line and said second outlet line; while in said second valve spool position, said first and second bypass orifices are at least substantially disabled, and said connecting portion is in fluid communication with said inlet line and said first outlet line; and dampers located on both ends of said valve spool for centering said valve spool, relative to said inlet line, in said neutral valve spool position.

13. The hydraulic valve assembly as in claim 12 wherein said first and second bypass orifices are at least substantially disabled simultaneously with said valve spool reaching one of said first and second positions, and wherein said first and second bypass orifices are enabled simultaneously with said valve spool reaching said neutral position.

14. The hydraulic valve assembly as in claim 12 wherein said dampers are springs.

15. The hydraulic valve assembly as in claim 12 wherein the volume of fluid transfer, while said valve spool is in said neutral position, is less than the volume of fluid transfer while said valve spool is in one of said first or second positions.

16. The hydraulic valve assembly as in claim 12 wherein a length of said first bypass orifice, located in said valve spool first end portion has a cross-section smaller than a length of said first bypass orifice located in said valve spool connecting portion, and wherein a length of said second bypass orifice, located in said valve spool second end portion has a cross-section smaller than a length of said second bypass orifice located in said connecting portion.

17. The hydraulic valve assembly as in claim 12 wherein said at least substantially disabling of said first and second bypass orifices, occurs as a result of said orifice ends in said valve spool end portions, being in juxtaposed relationships with said valve bore during the operating positions of valve spool.

18. The hydraulic valve assembly as in claim 12 wherein said first port is longitudinally centered relative to said second and third port.

19. The hydraulic valve assembly as in claim 12 wherein the distance from said connecting portion to said first bypass orifice on said first end of said valve spool is equal to the diameter of said second port.

20. The hydraulic valve assembly as in claim 12 wherein the distance from said connecting portion to said second bypass orifice on said second end of said valve spool is equal to the diameter of said third port.

21. The hydraulic valve assembly as in claim 15 wherein the movement of said valve spool from said neutral position to said first or second position reduces the power loss within said closed-loop circuit.

22. A hydraulic valve assembly for controlling fluid transfer from a first and second inlet line to an outlet line within a closed-loop circuit, said assembly comprising:

a valve body defining a first port for connection to said first inlet line, a second port for connection to said second inlet line, a third port for connection to said outlet line, and a spool bore in fluid communication with said first inlet line, said second inlet line and said outlet line;

a valve spool, adapted for sealing reciprocation within said spool bore, having a first end portion, a second end portion, a connecting portion with a cross-sectional area smaller than that of the first and second end portions, a first bypass orifice within said valve spool extending from said first end portion to said connecting portion, and a second bypass orifice within said valve spool extending from said second end portion to said connecting portion, said valve spool being movable from a neutral position, in which said valve spool is longitudinally centered within said spool bore relative to said outlet line, occurring when the fluid pressure forces in said first and second inlet lines are substantially similar, to a first position, occurring when the fluid pressure forces in the first inlet line are greater than the fluid pressure forces in said second inlet line, or to a second position, occurring when the fluid pressure forces in the first inlet line are less than the fluid pressure forces in the second inlet line, with said connecting portion being in fluid communication with at least a portion of said first port at each of said positions of said valve spool, wherein: while in said neutral valve spool position, said first bypass orifice is aligned with said first inlet line, said second bypass orifice is aligned with said second inlet line and said connecting portion is centered relative to said outlet line; while in said first valve spool position, said first and second bypass orifices are at least substantially disabled, and said connecting portion is in fluid communication with said second inlet line and said outlet line; while in said second valve spool position, said first and second bypass orifices are at least substantially disabled, and said connecting portion is in fluid communication with said first inlet line and said outlet line; and dampers located on both ends of said valve spool for centering said valve spool, relative to said outlet line, in said neutral valve spool position.

23. The hydraulic valve assembly as in claim 22 wherein said first and second bypass orifices are at least substantially disabled simultaneously with said valve spool reaching one of said first and second positions, and wherein said first and second bypass orifices are enabled simultaneously with said valve spool reaching said neutral position.

24. The hydraulic valve assembly as in claim 22 wherein said dampers are spring.

25. The hydraulic valve assembly as in claim 22 wherein said at least substantially disabling of said first and second bypass orifices, occurs as a result of said orifice ends in said valve spool end portions being in a juxtoposed position with said valve bore during the operating positions of said valve spool.

26. The hydraulic valve assembly as in claim 22 wherein said third port is longitudinally centered relative to said first and second port.

27. The hydraulic valve assembly as in claim 22 wherein the distance from said connecting portion to said first bypass orifice on said first end of said valve spool is equal to the diameter of said first port.

28. The hydraulic valve assembly as in claim 22 wherein the distance from said connecting portion to said second bypass orifice on said second end of said valve spool is equal to the diameter of said second port.

29. The hydraulic valve assembly as in claim 22 wherein said outlet line is an exhaust line.

30. The hydraulic valve assembly as in claim 22 wherein said first and second bypass orifices can have a cross-sectional area as large as said first and second inlet lines.

31. A hydraulic valve assembly, for use in a hydrostatic transmission, for controlling fluid transfer between a first, a second and a third line within a closed-loop circuit, wherein two of said first, second and third lines define first and second pressure lines and are located at substantially similar longitudinal distances from the remaining one of said first, second and third lines, said remaining line being rotationally displaced relative to said first and second pressure lines, said valve assembly comprising:

a valve body defining a first port for connection to said remaining line, a second port for connection to one of said first and second pressure lines, and a third port for connection to the other of said first and second pressure lines, said valve body further including a spool bore in fluid communication with said first, second and third lines;

a valve spool adapted for sealing reciprocation within said spool bore, having a first end portion, a second end portion, a connecting portion having a cross-sectional area smaller than the cross-section of said first and second end portions, a first bypass orifice within said valve spool extending between said first end portion and said connecting portion, and a second bypass orifice within said valve spool extending between said second end portion and said connecting portion, said valve spool being movable from a neutral position, in which said valve spool is longitudinally centered within said spool bore and where the pressures forces in said first and second pressure lines are substantially similar, to a first position, occurring when the pressure forces in said first pressure line are greater than the pressure forces in said second pressure line, or to a second position, occurring when the pressure forces in said first pressure line are less than the pressure forces in said second pressure line, with said connecting portion being in fluid communication with at least a portion of said first port at each of said positions of said valve spool, wherein: while in said neutral valve spool position, said first bypass orifice is aligned with said first pressure line for fluid communication with said remaining line and said second bypass orifice is aligned with said second pressure line for fluid communication with said remaining line; while in said first valve spool position, said first and said second bypass orifices are at least substantially disabled and said connecting portion is in fluid communication with one of said first and second pressure lines; while in said second valve spool position, said first and said second bypass orifices are at least substantially disabled and said connecting portion is in fluid communication with the other of said first and second pressure lines; and dampers located at both ends of said valve spool for centering said valve spool relative to said remaining line in said neutral valve spool position.

32. The hydraulic valve assembly as in claim 31 wherein said dampers are springs.

33. The hydraulic valve assembly as in claim 31 wherein the volume of fluid transfer, while said valve spool is in said neutral position, is less than the volume of fluid transfer while said valve spool is in one of said first or second positions.

34. The hydraulic valve assembly as in claim 31 wherein said first port is equally spaced from said second and third ports.

35. The hydraulic valve assembly as in claim 31 wherein said first and second bypass orifices are disabled simultaneously with said valve spool reaching one of said first and second positions, and wherein said first and second bypass orifices are enabled simultaneously with said valve spool reaching said neutral position.

36. The hydraulic valve assembly as in claim 31 wherein said first line is an inlet line for the charge pump outlet fluid and said second and third lines are outlet lines.

37. The hydraulic valve assembly as in claim 31 wherein said first and second bypass orifices can have a cross-sectional area as large as said inlet line.

38. The hydraulic valve assembly as in claim 31 wherein said first and second lines are inlet lines and said third line is an exhaust line.

39. A method for increasing the width of the dead band of a hydrostatic transmission, in a neutral mode of operation without impairing the performance of said hydrostatic transmission in non-neutral modes of operation, wherein said hydrostatic transmission includes: a variable displacement main pump; a hydraulic motor, a hydraulic circuit operatively interconnecting said main pump and motor; a charge pump, operatively interconnected within said circuit, having an outlet line; a valve block, operatively interconnected within said circuit, having an inlet line, in communication with said charge pump outlet line, and having first and second outlet lines in communication with said hydraulic circuit; a valve body having a first port connected with said inlet line, a second port connected with said first outlet line, a third port connected with said second outlet line; a spool bore in fluid communication with inlet, first outlet and second outlet lines; a valve spool, adapted for sealing longitudinal movement within said spool bore, having a first end portion, a second end portion and a connecting portion having a cross-sectional profile smaller than that of said first and second portions; and dampers for centering said valve spool in a neutral mode of operation, said method comprising:

a. including a first bypass orifice within said valve spool extending between said first end portion and said connecting portion;

b. including a second bypass orifice within said valve spool extending between said second end portion and said connecting portion;

c. keeping said connecting portion in fluid communication with said first port at all times;

d. permitting substantially equal fluid flows from said first port, via said first and second bypass orifices, to said first and second outlet ports, respectively, in said neutral mode of operation when the fluid forces acting on the first and second end portions are about equal;

shifting said valve spool from said neutral mode of operation to non-neutral modes of operation during which the fluid forces acting on said first and second end portions are unequal, to thereby at least substantially disable said fluid flows via said first and second bypass orifices while simultaneously permitting fluid flows from said inlet line to one of said first and second outlet ports.

40. The method as in claim 39 wherein said shifting of said valve spool during said non-neutral mode of operation locates said valve spool in a first position where the pressure in said first outlet line is greater than the pressure in said second outlet line and fluid flows from said inlet line to said second outlet line.

41. The method as in claim 39 wherein said shifting of said valve spool during said non-neutral mode of operation locates said valve spool in a second position where the pressure in said first outlet line is less than the pressure in said second outlet line and fluid flows from said inlet line to said first outlet line.

42. The method as in claim 39 wherein said fluid flows from said inlet line to one of said first and second outlet ports prevents cavitation within said hydraulic circuit.

* * * * *